United States Patent
Kim et al.

(10) Patent No.: US 9,462,277 B2
(45) Date of Patent: *Oct. 4, 2016

(54) METHOD AND APPARATUS FOR ENCODING/DECODING IMAGE USING VARIABLE SIZED MACROBLOCKS

(71) Applicant: SK TELECOM CO., LTD., Seoul (KR)

(72) Inventors: Sunyeon Kim, Seoul (KR); Jeongyeon Lim, Seongnam-si (KR); Joohee Moon, Seoul (KR); Yunglyul Lee, Seoul (KR); Haekwang Kim, Seoul (KR); Byeungwoo Jeon, Seongnam-si (KR); Hyoungmee Park, Suwon-si (KR); Mincheol Park, Bucheon-si (KR); Dongwon Kim, Seoul (KR); Kibaek Kim, Seoul (KR); Juock Lee, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/744,359

(22) Filed: Jun. 19, 2015

(65) Prior Publication Data

US 2015/0288960 A1   Oct. 8, 2015

Related U.S. Application Data

(63) Continuation of application No. 13/954,408, filed on Jul. 30, 2013, now Pat. No. 9,215,461, which is a continuation of application No. 13/499,345, filed as application No. PCT/KR2010/006734 on Oct. 1, 2010, now abandoned.

(30) Foreign Application Priority Data

Oct. 1, 2009 (KR) .................. 10-2009-0093982
Oct. 1, 2010 (KR) .................. 10-2010-0095905

(51) Int. Cl.
*H04N 7/12* (2006.01)
*H04N 19/105* (2014.01)
(Continued)

(52) U.S. Cl.
CPC .......... *H04N 19/105* (2014.11); *H04N 19/103* (2014.11); *H04N 19/109* (2014.11);
(Continued)

(58) Field of Classification Search
CPC ................................................ H04N 19/105
USPC ................................................ 375/240.12
See application file for complete search history.

(56) References Cited

U.S. PATENT DOCUMENTS

2005/0069211 A1   3/2005   Lee et al.
2006/0120450 A1   6/2006   Han et al.
(Continued)

FOREIGN PATENT DOCUMENTS

CN   102172021 A   8/2011
KR   1020080047954 A   5/2008
WO   2003-045069 A2   5/2003

OTHER PUBLICATIONS

"Video Coding Using Extended Block Sizes", Qualcomm Inc. Telecommunication Standardization Sector, International Telecommunication Union, Jan. 2009, pp. 1-4, COM 16-C123-E.
(Continued)

*Primary Examiner* — Richard Torrente
(74) *Attorney, Agent, or Firm* — Hauptman Ham, LLP

(57) ABSTRACT

A method performed by an apparatus of decoding a video in the unit of blocks, includes: decoding information on a block size from a bitstream; determining a maximum block size to be used for decoding an encoded image, based on the information on the block size; and reconstructing an image by decoding the encoded image using the determined maximum block size, wherein the information on the block size includes a first information on a minimum block size and a second information on a difference between the minimum block size and the maximum block size.

10 Claims, 22 Drawing Sheets

(51) Int. Cl.
  *H04N 19/503*   (2014.01)
  *H04N 19/176*   (2014.01)
  *H04N 19/70*    (2014.01)
  *H04N 19/119*   (2014.01)
  *H04N 19/172*   (2014.01)
  *H04N 19/61*    (2014.01)
  *H04N 19/593*   (2014.01)
  *H04N 19/11*    (2014.01)
  *H04N 19/103*   (2014.01)
  *H04N 19/109*   (2014.01)
  *H04N 19/136*   (2014.01)
  *H04N 19/146*   (2014.01)
  *H04N 19/157*   (2014.01)
  *H04N 19/177*   (2014.01)
  *H04N 19/174*   (2014.01)
  *H04N 19/17*    (2014.01)
  *H04N 19/467*   (2014.01)
  *H04N 19/159*   (2014.01)

(52) U.S. Cl.
  CPC .......... *H04N 19/11* (2014.11); *H04N 19/119* (2014.11); *H04N 19/136* (2014.11); *H04N 19/146* (2014.11); *H04N 19/157* (2014.11); *H04N 19/159* (2014.11); *H04N 19/17* (2014.11); *H04N 19/172* (2014.11); *H04N 19/174* (2014.11); *H04N 19/176* (2014.11); *H04N 19/177* (2014.11); *H04N 19/467* (2014.11); *H04N 19/503* (2014.11); *H04N 19/593* (2014.11); *H04N 19/61* (2014.11); *H04N 19/70* (2014.11)

(56) References Cited

U.S. PATENT DOCUMENTS

| | | |
|---|---|---|
| 2006/0133503 A1 | 6/2006 | Park et al. |
| 2006/0193386 A1 | 8/2006 | Lin et al. |
| 2007/0140345 A1 | 6/2007 | Osamoto et al. |
| 2009/0003716 A1 | 1/2009 | Sekiguchi et al. |
| 2010/0086032 A1* | 4/2010 | Chen .................... H04N 19/176 375/240.12 |
| 2011/0002391 A1* | 1/2011 | Uslubas ............... H04N 19/176 375/240.16 |
| 2011/0194613 A1 | 8/2011 | Chen et al. |

OTHER PUBLICATIONS

International Search Report mailed Jun. 3, 2011 for PCT/KR2010/006734.

Wiegand, Thomas et al., "Overview of the H.264/AVC Video Coding Standard", IEEE Transactions on Circuits and Systems for Video Technology, Jul. 2003, 560-576 pages, vol. 13, No. 7.

Jaeil Kim et al., "Enlaring MB size for high fidelity video coding beyond HD", Oct. 8-10, 2008, pp. 1-6.

Jae-Chool Lee et al., "Hierarchical Block Mode Structure Extension for Video Coding", 2008, pp. 73-74.

Siwei Ma et al., "High-deficition Video Coding with Super-macroblocks", 2007, pp. 1-12, vol. 6508 650816.

Soon-Kak Kwon et al., "Overview of H.264/MPEG-4 part 10", May 16, 2004, pp. 186-216.

* cited by examiner

M, N ARE INTEGERS EQUAL TO OR LARGER THAN "16"

CIF IMAGE INCLUDING 396 MACROBLOCKS OF SIZE 16 × 16

CIF IMAGE INCLUDING 54 MACROBLOCKS OF SIZE 64 × 32

METHOD AND APPARATUS FOR ENCODING/DECODING IMAGE USING VARIABLE SIZED MACROBLOCKS

CROSS-REFERENCE TO RELATED APPLICATIONS

The present application is a continuation of U.S. patent application Ser. No. 13/954,408 filed Jul. 30, 2013, which is a continuation of U.S. patent application Ser. No. 13/499,345 filed Jul. 12, 2012, which is a the National Phase application of International Patent Application No. PCT/KR2010/006734, filed on Oct. 1, 2010, which is based upon and claims the benefit of priority to Korean Patent Application No. 10-2009-0093982, filed on Oct. 1, 2009 and Korean Patent Application No. 10-2010-0095905, filed on Oct. 1, 2010. The disclosures of the above-listed applications are hereby incorporated by reference herein in their entirety.

TECHNICAL FIELD

The present disclosure in one or more embodiments relates to an apparatus and a method for encoding and decoding a high resolution image effectively by using variable sized blocks.

BACKGROUND

The statements in this section merely provide background information related to the present disclosure and do not constitute prior art.

Technologies for compressing video data include H.261, H.263, H.264, MPEG-2, MPEG-4, and so on. According to such video compression standards, each image is divided and encoded into fixedly sized macroblocks formed of rectangular areas having pixels sized 16×16 of luma component and pixels sized 8×8 of chroma component. All luma components and all chroma components of each macroblock are spatially or temporally predicted, and then a predicted residual undergoes a transform, a quantization, and an entropy coding and finally a transmission.

The inventor(s) has noted that the enacted H.264/AVC standard prescribes an encoding apparatus to use a 16×16 pixel block for the fixed macroblock size and subdivide each macroblock into smaller blocks for which an intra prediction or an inter prediction is carried out. In carrying out the intra prediction encoding, each macroblock may be divided into 16×16, 8×8, or 4×4 sizes, and the block of size 16×16 is intra predicted in one of four prediction modes, 8×8 and 4×4 blocks are intra predicted in one of nine prediction modes. In the case of inter prediction, the macroblock may be subdivided into blocks of sizes 16×16, 16×8, 8×16, 8×8, 8×4, 4×8, or 4×4, and then used for the inter prediction through a motion compensation. The transform is performed in the unit of 8×8 or 4×4 sized blocks, and the quantization used for the transform coefficients is scalar quantization.

However, the inventor(s) has noted that the 16×16 macroblock may be considered appropriate for small images by the class of the known QCIF (Quarter Common Intermediate Format) and CIF (Common Intermediate Format) and it is not the right macroblock size for compressing a high resolution image such as a 4K×2K image. In addition, the inventor(s) has noted that since typical video compression technology uses a fixedly sized macroblock in encoding an image (even though H.264/AVC subdivides and encodes macroblock into smaller block units, the macroblock is of a fixed size), encoding the high resolution image hardly achieves a sufficient encoding efficiency.

SUMMARY

In accordance with an aspect of the present disclosure, a method performed by an apparatus of decoding a video in the unit of blocks, includes: decoding information on a block size from a bitstream; determining a maximum block size to be used for decoding an encoded image, based on the information on the block size; and reconstructing an image by decoding the encoded image using the determined maximum block size. Herein, the information on the block size includes a first information on a minimum block size and a second information on a difference between the minimum block size and the maximum block size.

In accordance with an aspect of the present disclosure, an apparatus of decoding a video in the unit of blocks, comprises a size determiner and a video decoder. The size determiner is configured to extract information on a block size from a bitstream, and determine a maximum block size to be used for decoding an encoded image, based on the information on the block size. And the video decoder is configured to reconstruct an image by decoding the encoded image using the determined maximum block size. Herein, the information on the block size includes a first information on a minimum block size and a second information on a difference between the minimum block size and the maximum block size.

DETAILED DESCRIPTION

Figure 1:
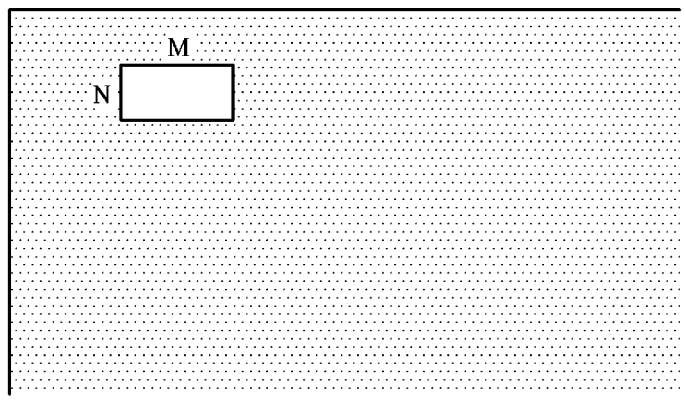
FIGS. 1 to 3 are exemplary diagrams of macroblocks in the unit of M×N pixels according to at least one embodiment of the disclosure.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear. Some embodiments of the present disclosure provide a method for determining a block type to match the image characteristics and a method and an apparatus effective for encoding and/or decoding when a large pixel block over size 16×16 is used for a macroblock as an encoding and/or decoding unit.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A video encoding apparatus and a video decoding apparatus, which will be discussed in the following description, may be a Personal Computer (PC), a notebook computer, a Personal Digital Assistant (PDA), a Portable Multimedia Player (PMP), a PlayStation Portable (PSP), and a mobile communication terminal, and refer to various apparatuses including a communication apparatus such as a communication modem for performing communication with various devices or a wired/wireless communication network, a memory for storing various programs and data for encoding or decoding a video, and a microprocessor for executing a program to perform an operation and a control.

Further, a video encoded into a bitstream by a video encoding apparatus is transmitted to a video decoding apparatus through a wired/wireless communication network such as an internet, a near field communication network, a wireless LAN (Local Area Network), a WiBro (Wireless Broadband) network, and a mobile communication network or through a communication interface such as a cable or a Universal Serial Bus (USB) in real-time or non-real time and decoded in the video decoding apparatus, and thus the decoded video may be reconstructed and reproduced as a video.

In general, a video includes a series of pictures and each picture is divided into predetermined areas such as macroblocks, which are the reference unit for encoding and decoding an image. The macroblocks are classified into an intra macroblock and an inter macroblock according to a macroblock decoding method. The intra macroblock refers to a macroblock encoded using an intra prediction coding. The intra prediction coding corresponds to a scheme of generating a predicted block by predicting a current block pixel by using pixels of reconstructed blocks previously encoded and decoded within a current picture, in which a current encoding is performed, and encoding a differential value between the generated predicted block and the current block pixel. The inter macroblock refers to a macroblock encoded using an inter prediction coding. The inter prediction coding corresponds to a scheme of generating a predicted block by predicting a current block within a current picture with reference to one or more past pictures or future pictures and encoding a differential value between the generated predicted block and the current block. Here, a picture referred to in encoding or decoding the current picture is called a reference picture.

Hereinafter, an apparatus for encoding and decoding a video in the unit of macroblocks by using fixedly sized macroblocks will be described with an illustration. Here, the macroblocks refer to M×N sized pixel blocks (however, M and N are integers, wherein M is a horizontal size of the macroblock and N is a vertical size of the macroblock, and thus 0<M<a horizontal size of an input image and 0<N<a vertical size of the input image) and correspond to the encoding and decoding units. However, encoding and decoding a video in the unit of macroblocks are only an example, and the video may be encoded and decoded in the unit of defined areas or undefined areas instead of a form of macroblocks. However, an encoding and/or decoding apparatus, which will be discussed in the following description, can use macroblocks having a certain size, but an encoder and a decoder encodes and/or decodes an image using macroblock sizes agreed between the encoder and the decoder, available subblock types and modes, and minimum subblock sizes.

Figure 2:
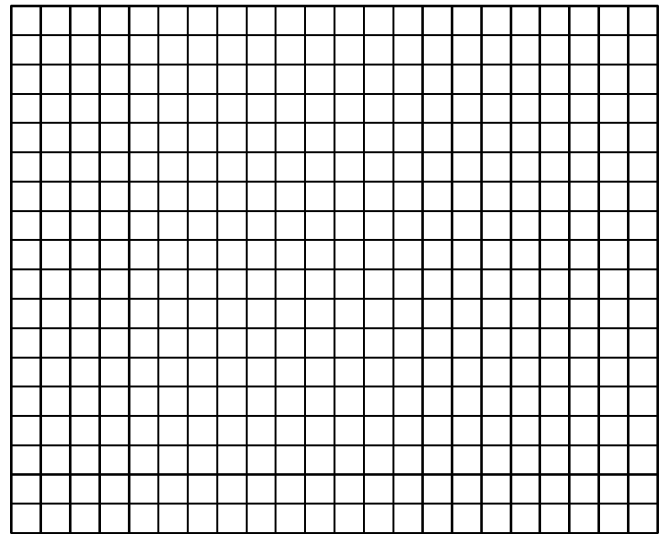
Figure 3:
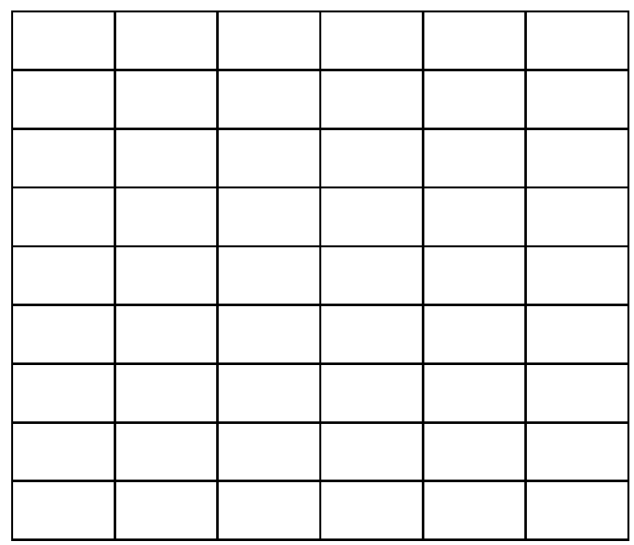

FIGS. 1 to 3 are exemplary diagrams of macroblocks in the unit of M×N pixels according to at least one embodiment of the present disclosure.

FIG. 1 shows macroblocks in the unit of M×N pixels (hereinafter, referred to as macroblocks of size M×N) expressed in a part of an input image having a certain size as an example, FIG. 2 shows a CIF image including 396 macroblocks of size 16×16 as an example, and FIG. 3 shows a CIF image including 54 macroblocks of size 64×32 as an example.

In the known video compression technology, an image is divided into macroblocks of fixed size 16×16 and then encoded and decoded as shown in FIG. 2. However, in an embodiment of the present disclosure, the image may be encoded and decoded using macroblocks of size 64×32 (not only the size 64×32 but also size M×N (greater than a size 16×16) such as size 64×64 and size 32×64 are available) as shown in FIG. 3.

Figure 4:
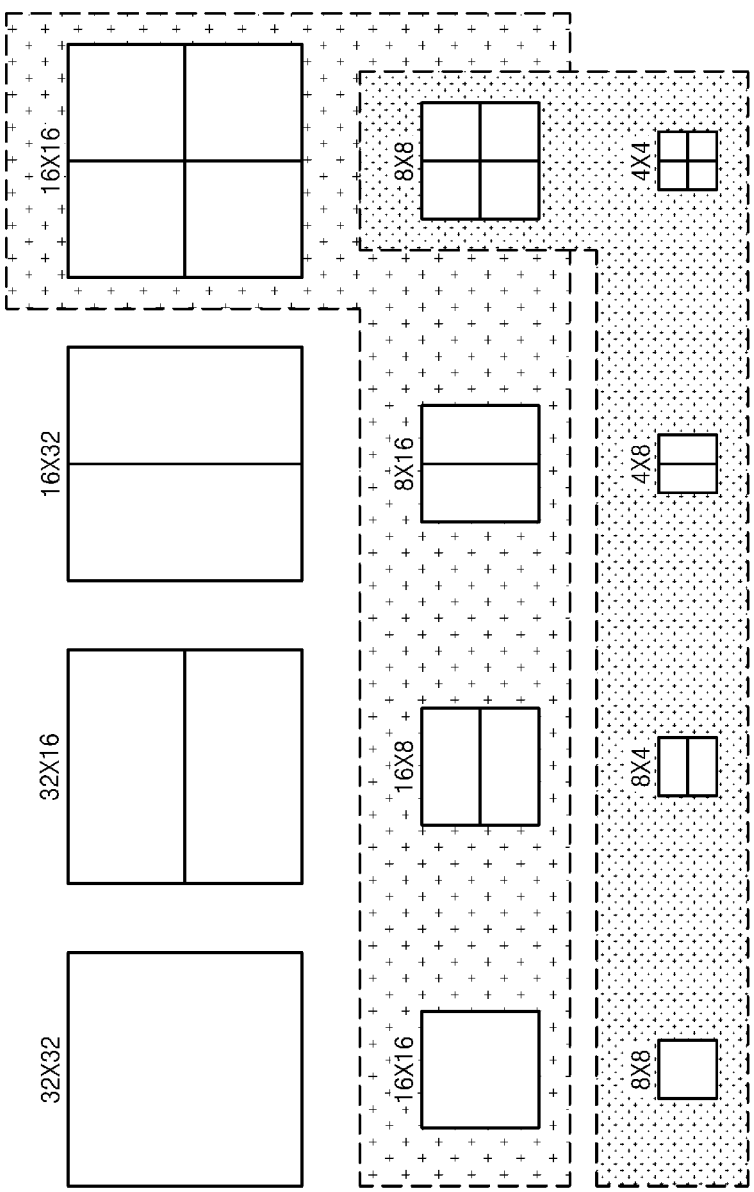
FIGS. 4 and 5 are exemplary diagrams of various subblock modes according to at least one embodiment of the disclosure.
Figure 5:
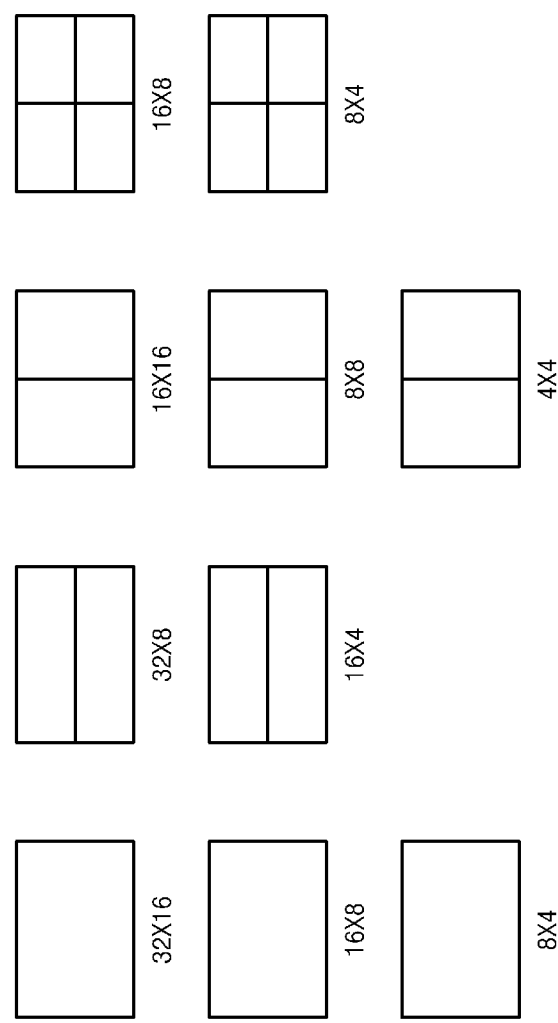

FIGS. 4 and 5 are exemplary diagrams of various subblocks according to at least one embodiment of the present disclosure.

FIG. 4 shows subblock modes available for a macroblock of size 32×32, and FIG. 5 shows subblock modes available for a macroblock of size 32×16.

According to at least one embodiment of the present disclosure, the macroblock of size M×N may be divided into smaller blocks, that is, subblocks as shown in FIG. 5. Macroblocks of the image may be intra prediction encoded or inter prediction encoded in the unit of macroblocks, subblocks, or designated predictions.

Figure 6:
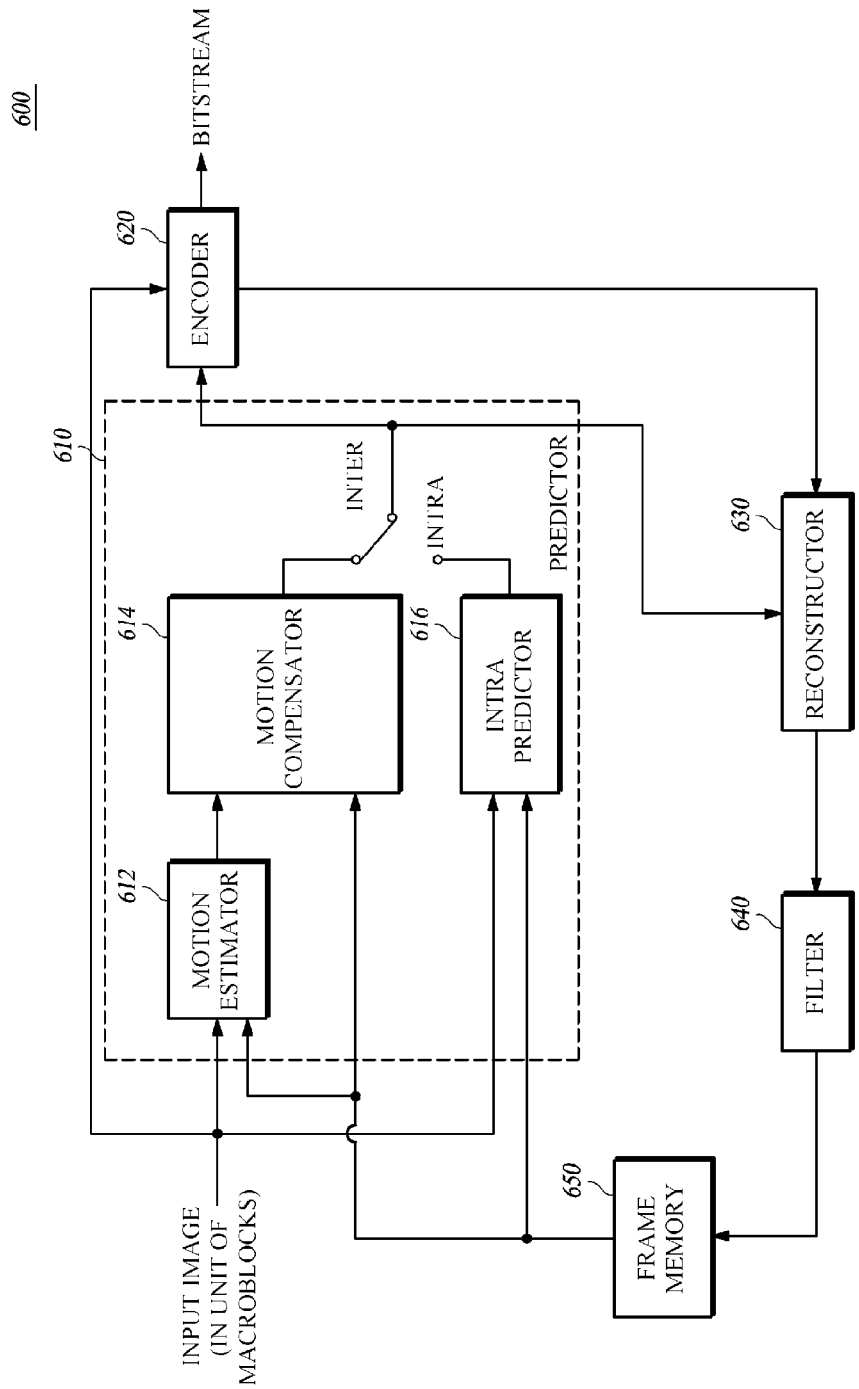
FIG. 6 is a schematic block diagram of a video encoding apparatus according to at least one embodiment of the disclosure.

FIG. 6 is a schematic block diagram of a video encoding apparatus according to at least one embodiment of the present disclosure. The video encoding apparatus according to the embodiment of the present disclosure corresponds to an apparatus for encoding an image by using macroblocks of size 16×16 or more, and may include a predictor 610, an encoder 620, a reconstructor 630, a filter 640, and a frame memory 650. Here, the reconstructor 630, the filter 640, and the frame memory 650 may be omitted or included in another element selectively according to an implementation manner. Other components of the video encoding apparatus, such as the predictor 610, the encoder 620, the reconstructor 630, and the filter 640 comprise one or more processors and/or application-specific integrated circuits (ASICs). The frame memory 650 includes at least one non-transitory non-transitory computer readable recording medium. The video encoding apparatus further comprises input units (not shown in FIG. 6) such as one or more buttons, a touch screen, a mic and so on, and output units (not shown in FIG. 6) such as a display, an indicator and so on.

The predictor 610 may include a motion estimator 612, a motion compensator 614, and an intra predictor 616, and predicts macroblocks of the input image by dividing the macroblocks into smaller macroblocks and then intra predicting or inter predicting the divided macroblocks. According to the known art, the intra prediction and the inter prediction cannot be simultaneously used in intra encoding subblocks within one macroblock. However, according to at least one embodiment of the present disclosure, the intra prediction and the inter prediction can be simultaneously used in encoding subblocks within one macroblock.

The motion estimator 612 generates a motion vector by comparing a block, which is desired to be encoded, with a reference picture stored in the frame memory 650 and estimating a motion of the corresponding block.

The motion compensator 614 fetches a block corresponding to a size of a block, which is desired to be encoded, from the reference picture stored in the frame memory 650 with reference to the motion vector generated by the motion estimator 612. The block having been fetched by the motion compensator 614 becomes a predicted block having a predicted value of the block, which is desired to be encoded.

The intra predictor 616 intra predicts the block, which is desired to be encoded. For the intra prediction, the intra predictor 616 generates a reference block by using reconstructed neighboring pixel information already encoded and decoded, and compares the reference block with the target block, which is to be encoded, to determine an intra prediction mode. And then, the intra predictor 606 intra predicts the block according to the determined intra prediction mode. The block having been predicted by the intra predictor 616 becomes a predicted block having a predicted value of the target block. A subblock size available in the intra prediction corresponds to (M/y)×(N/y), and y is an integer larger than 0 and smaller than min{log 2(M/4), log 2(N/4)}. For example, in a case of a macroblock of size 64×32, available subblock sizes for the intra prediction include sizes 64×32, 32×16, 16×8, and 8×4. In a case of a macroblock of size 32×32, subblock sizes available for the intra prediction include sizes 32×32, 16×16, 8×8, and 4×4. For another example, only square shaped blocks may be used. In a case of a macroblock of size 64×32, available subblock sizes include sizes 32×32, 16×16, 8×8, and 4×4.

Here, for blocks of size 16×16 or more (although however, the blocks may have other designated sizes instead of size 16×16), a prediction mode having the best encoding efficiency is selected from prediction modes equal or similar to four intra prediction modes of H.264/AVC, and the selected intra prediction mode is encoded. Further, for blocks having a size smaller than size 16×16, a prediction mode having the best encoding efficiency is selected from prediction modes equal or similar to nine intra prediction modes of H.264/AVC, and the selected prediction mode is encoded.

In this event, available transform types may be different according to a macroblock type and size. When the macroblock is an intra macroblock, blocks using an intra prediction of size 16×16 or more can use a transform of a size equal to that of the predicted block and a transform, in which a 4×4 transform is performed for a residual block and the 4×4 transform is performed again for DC components, and information on selected transform types is transmitted through a bitstream. Further, a transform having a size equal to that of the predicted block is used for blocks using an intra prediction having a size smaller than size 16×16 use. When the macroblock is an inter macroblock, blocks of size 16×16 or more use a 4×4 transform, 8×8 transform, or a 16×16 transform and a selected transform type is transmitted through a transform flag by using 1 bit or 2 bits. In other cases, a transform flag is transmitted in the unit of blocks of size 16×16 and subblocks within the block of size 16×16 all use the same transform. If the block of size 16×16 is divided into two blocks of size 8×16, a transform having the smallest encoding cost is selected from a 4×4 transform, a 8×8 transform, and a 8×16 transform. If the block of size 16×16 is divided into two blocks of size 16×8, the 4×4 transform, the 8×8 transform, and the 8×16 transform are used and a transform having the smallest encoding cost is selected. Further, a selected transform type is transmitted through a transform flag by using a 1 bit or 2 bits. Only when the block of size 16×16 is divided into 4 blocks of 8×8, the 4×4 transform or the 8×8 transform may be used, and a selected transform type is transmitted through the transform flag. In other cases, the transform flag is not transmitted.

The encoder 620 encodes a residual signal, which is a difference between pixel values of a target macroblock to be encoded and a predicted macroblock. Specifically, the encoder 620 encodes the residual signal through a transform, a quantization, and an entropy coding. Further, when the encoder 620 inter predicts the target macroblock to be encoded, the encoder 620 can encode motion information such as the motion vector generated by the motion estimator 612 and macroblock mode information such as a macroblock size. When the encoder 620 intra predicts the target macroblock to be encoded, the encoder 620 can encode prediction mode information such as an intra prediction mode and macroblock mode information such as the macroblock size. An encoding method of the encoder 620 includes various variable sized encoding methods such as CAVLC, CABAC, and so on. Further, as information on the performed encoding method, a flag or an index value of the table agreed between the encoder and the decoder may be included in and transmitted by a header of the bitstream.

The reconstructor 630 inversely quantizes and inversely transforms a transformed and quantized residual signal and adds the residual signal and the predicted macroblock output from the predictor 610 to reconstruct the target macroblock.

The filter 640 filters the reconstructed target macroblock by using a filter such as a deblocking filter. The filtered reconstructed macroblock is stored in the frame memory 650 and used for inter predicting a next macroblock or a macroblock of a next picture in the predictor 610.

Figure 20:
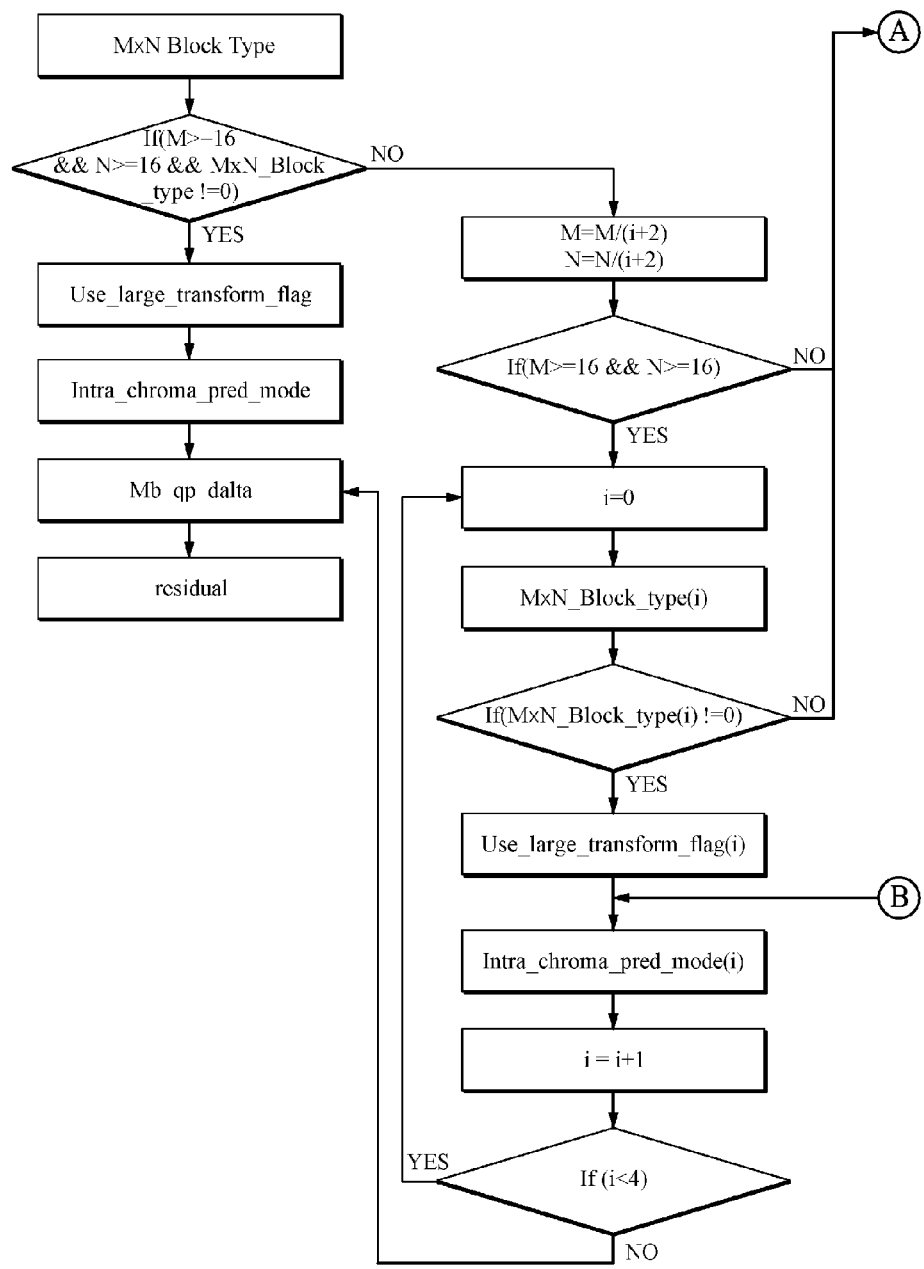
FIGS. 20 and 21 are a flow chart of an encoding method of an intra picture according to at least one embodiment of the disclosure.
Figure 21:
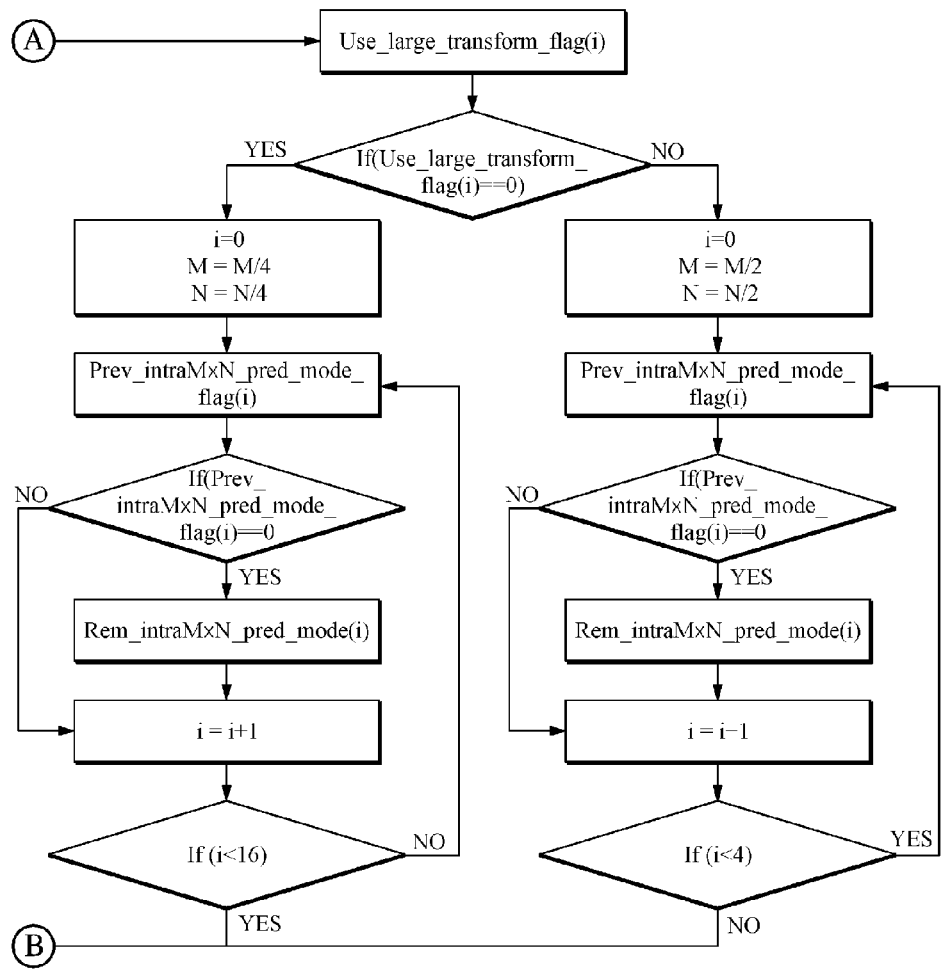

Hereinafter, an encoding method of an intra picture and data to be transmitted through a bitstream are described with reference to FIGS. 20 and 21. The intra picture may be encoded only using the intra prediction, and orders of encoding a macroblock type and an intra prediction mode are as shown in FIGS. 20 and 21. However, the title and the encoding order of the syntax of FIGS. 20 and 21 are only examples, and it is possible to use a title and an encoding order different from the title and the encoding order of FIGS. 20 and 21.

In FIGS. 20 and 21, M×N_Block_type is encoded using Table 1 for blocks of size 16×16 or more. Four intra prediction modes may be used for blocks of size 16×16 or more, and a residual block is transformed using a transform indicated by use_large_transform_flag.

In a case of blocks of size 16×16 or more, when use_large_transform_flag indicates that a large-size transform is not used (e.g. use_large_transform_flag is "0"), a 4×4 transform is performed and a Hardamard transform is performed for DC components of transform coefficients obtained through the 4×4 transform. When use_large_transform_flag indicates that the large-size transform is used (e.g. use_large_transform_flag is "1"), a transform having the same size as that of the current block is performed.

In a case of blocks having a size smaller than size 16×16, use_large_transform_flag is encoded once in the unit of 16×16 blocks. When use_large_transform_flag indicates that the large-size transform is not used (e.g. use_large_transform_flag is "0"), the 16×16 block is divided into sixteen 4×4 blocks. Each 4×4 block performs a 4×4 intra prediction and a residual block performs a 4×4 transform. Further, when use_large_transform_flag indicates that the large-size transform is used (e.g. use_large_transform_flag is "1"), the 16×16 block is divided into four 8×8 blocks. Each 8×8 block performs an 8×8 intra prediction and a residual block performs an 8×8 transform. In addition, blocks of a quantized transform coefficient of a luma component are allocated a 1 bit for every (M/2)×(N/2) block and it is shown whether there is a coefficient, which is not "0", within the (M/2)×(N/2) blocks through the allocated 1 bit.

Figure 22:
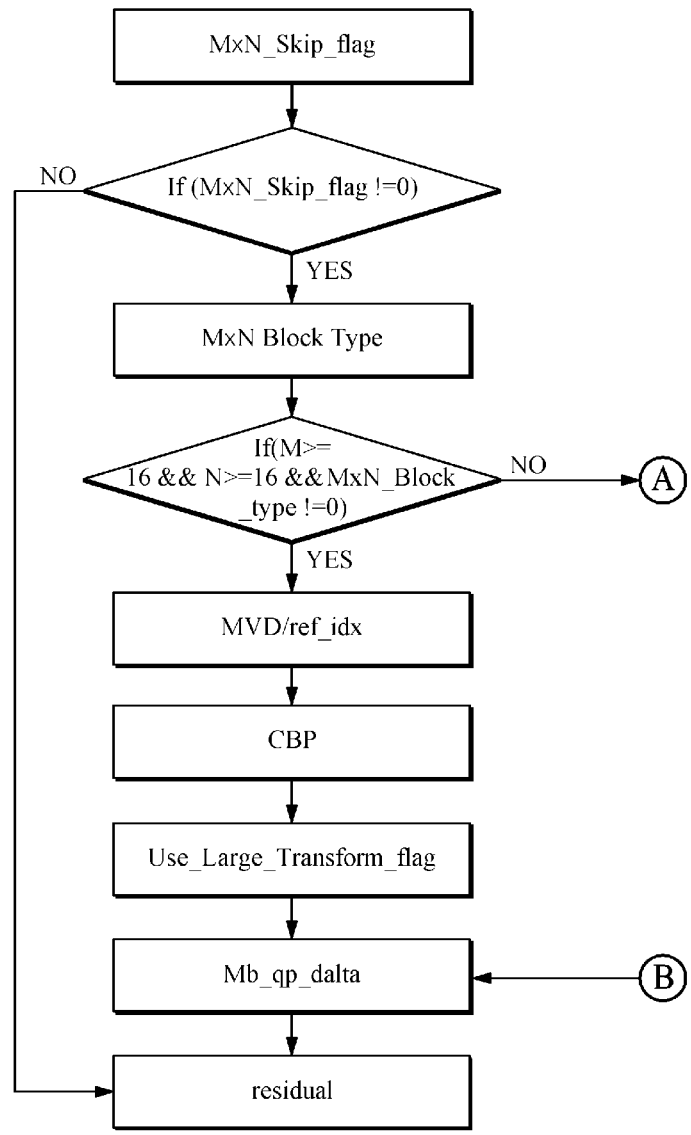
FIGS. 22 and 23 are a flow chart of an encoding method of an inter picture according to at least one embodiment of the disclosure.
Figure 23:
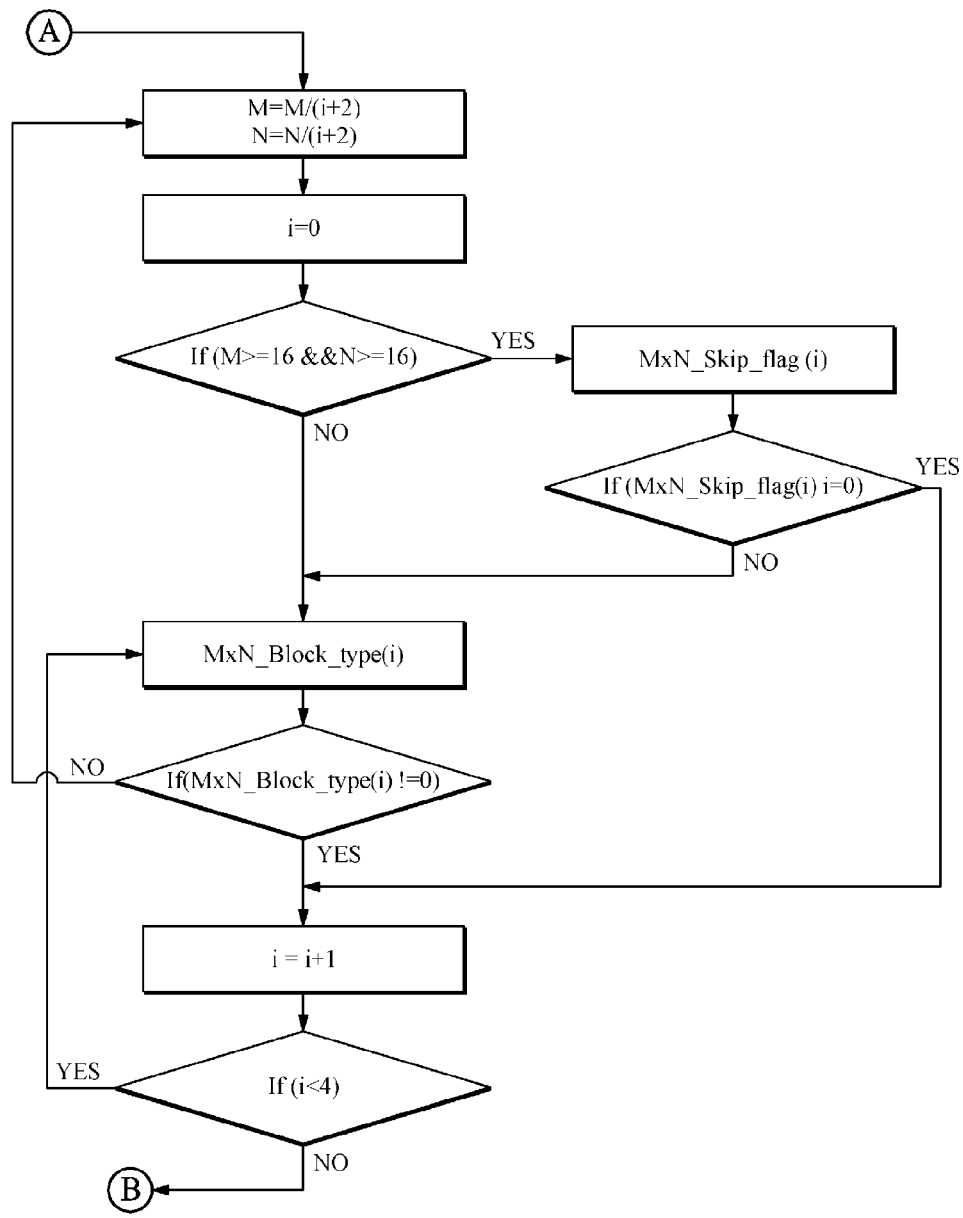

Hereinafter, an encoding method of an inter picture and data to be transmitted through a bitstream will be described with reference to FIGS. 22 and 23. The inter picture can selectively use the intra prediction or the inter prediction in the unit of macroblocks, and an encoding order of macroblock data including a macroblock type within the inter picture is as shown in FIGS. 22 and 23. However, the title and the encoding order of the syntax of FIGS. 22 and 23 are only examples, and it is possible to use a title and an encoding order different from the title and the encoding order of FIGS. 22 and 23.

In a case of a M×N block type equal to or larger than size 16×16, a picture P may be encoded using Table 2 and a picture B may be encoded using Table 3.

TABLE 1

| M × N Block_type | Name of M × N_block_type | Block size | Intra prediction mode | CBP_Chrom | CBP_Luma |
|---|---|---|---|---|---|
| 0 | I_(M/2) × (N/2) | Intra_(M/2) × (N/2) | — | | |
| 1 | I_M × N_0_0_0 | I_M × N | 0 | 0 | 0 |
| 2 | I_M × N_1_0_0 | I_M × N | 1 | 0 | 0 |
| 3 | I_M × N_2_0_0 | I_M × N | 2 | 0 | 0 |
| 4 | I_M × N_3_0_0 | I_M × N | 3 | 0 | 0 |
| 5 | I_M × N_0_1_0 | I_M × N | 0 | 1 | 0 |
| 6 | I_M × N_1_1_0 | I_M × N | 1 | 1 | 0 |
| 7 | I_M × N_2_1_0 | I_M × N | 2 | 1 | 0 |
| 8 | I_M × N_3_1_0 | I_M × N | 3 | 1 | 0 |
| 9 | I_M × N_0_2_0 | I_M × N | 0 | 2 | 0 |
| 10 | I_M × N_1_2_0 | I_M × N | 1 | 2 | 0 |
| 11 | I_M × N_2_2_0 | I_M × N | 2 | 2 | 0 |
| 12 | I_M × N_3_2_0 | I_M × N | 3 | 2 | 0 |
| 13 | I_M × N_0_0_1 | I_M × N | 0 | 0 | 15 |
| 14 | I_M × N_1_0_1 | I_M × N | 1 | 0 | 15 |
| 15 | I_M × N_2_0_1 | I_M × N | 2 | 0 | 15 |
| 16 | I_M × N_3_0_1 | I_M × N | 3 | 0 | 15 |
| 17 | I_M × N_0_1_1 | I_M × N | 0 | 1 | 15 |
| 18 | I_M × N_1_1_1 | I_M × N | 1 | 1 | 15 |
| 19 | I_M × N_2_1_1 | I_M × N | 2 | 1 | 15 |
| 20 | I_M × N_3_1_1 | I_M × N | 3 | 1 | 15 |
| 21 | I_M × N_0_2_1 | I_M × N | 0 | 2 | 15 |
| 22 | I_M × N_1_2_1 | I_M × N | 1 | 2 | 15 |
| 23 | I_M × N_2_2_1 | I_M × N | 2 | 2 | 15 |
| 24 | I_M × N_3_2_1 | I_M × N | 3 | 2 | 15 |
| 25 | I_PCM | na | na | na | na |

TABLE 2

| M × N Block_type | Name of M × N_block_type | Number of subblocks within M × N block | MbPartPredMode (mb_type, 0) | MbPartPredMode (mb_type, 1) | MbPartWidth (mb_type) | MbPartHeight (mb_type) |
|---|---|---|---|---|---|---|
| 0 | P_L0_M × N | 1 | Pred_L0 | — | M | N |
| 1 | P_L0_L0_(M/2) | 2 | Pred_L0 | Pred_L0 | M | N/2 |
| 2 | P_L0_L0_(M/2) × N | 2 | Pred_L0 | Pred_L0 | M/2 | N |
| 3 | P_(M/2) × (N/2) | 4 | — | — | M/2 | N/2 |
| 4 | P_(M/2) × (N/2)_ref0 | 4 | — | — | M/2 | N/2 |
| inferred | P_Skip | 1 | Pred_L0 | — | M | N |

TABLE 3

| M × N Block_type | Name of M × N_block_type | Number of subblocks within M × N block | MbPartPredMode (mb_type, 0) | MbPartPredMode (mb_type, 1) | MbPartWidth (mb_type) | MbPartHeight (mb_type) |
|---|---|---|---|---|---|---|
| 0 | B_Direct M × N | na | Direct | na | M/2 | N/2 |
| 1 | B_L0_M × N | 1 | Pred_L0 | na | M | N |
| 2 | B_L1_M × N | 1 | Pred_L1 | na | M | N |
| 3 | B_Bi_M × N | 1 | BiFred | na | M | N |
| 4 | B_L0_L0_M × (N/2) | 2 | Pred_L0 | Pred_L0 | M | N/2 |
| 5 | B_L0_L0_(M/2) × N | 2 | Pred_L0 | Pred_L0 | M/2 | N |
| 6 | B_L1_L1_M × (N/2) | 2 | Pred_L1 | Pred_L1 | M | N/2 |
| 7 | B_L1_L1_(M/2) × N | 2 | Pred_L1 | Pred_L1 | M/2 | N |
| 8 | B_L0_L1_M × (N/2) | 2 | Pred_L0 | Pred_L1 | M | N/2 |
| 9 | B_L0_L1_(M/2) × N | 2 | Pred_L0 | Pred_L1 | M/2 | N |
| 10 | B_L1_L0_M × (N/2) | 2 | Pred_L1 | Pred_L0 | M | N/2 |
| 11 | B_L1_L0_(M/2) × N | 2 | Pred_L1 | Pred_L0 | M/2 | N |
| 12 | B_L0_Bi_M × (N/2) | 2 | Pred_L0 | BiPred | M | N/2 |
| 13 | B_L0_Bi_(M/2) × N | 2 | Pred_L0 | BiPred | M/2 | N |
| 14 | B_L1_Bi_M × (N/2) | 2 | Pred_L1 | BiPred | M | N/2 |
| 15 | B_L1_Bi_(M/2) × N | 2 | Pred_L1 | BiPred | M/2 | N |
| 16 | B_Bi_L0_M × (N/2) | 2 | BiPred | Pred_L0 | M | N/2 |
| 17 | B_Bi_L0_(M/2) × N | 2 | BiPred | Pred_L0 | M/2 | N |
| 18 | B_Bi_L1_M × (N/2) | 2 | BiPred | Pred_L1 | M | N/2 |
| 19 | B_Bi_L1_(M/2) × N | 2 | BiPred | Pred_L1 | M/2 | N |
| 20 | B_Bi_Bi_M × (N/2) | 2 | BiPred | BiPred | M | N/2 |
| 21 | B_Bi_Bi_(M/2) × N | 2 | BiPred | BiPred | M/2 | N |
| 22 | B_(M/2) × (N/2) | 4 | na | na | M/2 | N/2 |
| inferred | B_Skip | na | Direct | na | M/2 | N/2 |

Intra macroblocks within the picture P use Table 1, wherein a number of M×N_block_type is allocated a value of M×N_block_type+5 of the intra. That is, a value of a mode I_M×N_0_0_0 (corresponding to a mode indicating that a block type is the intra macroblock, an M×N intra prediction is used, a prediction mode value is "0", and there is no transform coefficient of luma components and chroma components) within the picture P is "6".

Macroblocks within the picture B use Table 1, wherein a number of M×N_block_type is allocated a value of M×N_block_type+23 of the intra.

In a case of a M×N block type equal to or smaller than size 8×8, the picture P may be encoded using Table 4, and the picture B may be encoded using Table 5.

TABLE 4

| sub_mb_type[mbPartIdx] | Name of sub_mb_type [mbPartIdx] | NumSubMbPart (sub_mb_type[mbPartIdx]) | SubMbPredMode (sub_mb_type[mbPartIdx]) | SubMbPartWIdth (sub_mb_type[mbPartIdx]) | SubMbPartWIdth (sub_mb_type[mbPartIdx]) |
|---|---|---|---|---|---|
| inferred | na | na | na | na | na |
| 0 | P_L0_8x8 | 1 | Pred_L0 | 8 | 8 |
| 1 | P_L0_8x4 | 2 | Pred_L0 | 8 | 4 |
| 2 | P_L0_4x8 | 2 | Pred_L0 | 4 | 8 |
| 3 | P_L0_4x4 | 4 | Pred_L0 | 4 | 4 |

TABLE 5

| sub_mb_type[mbPartIdx] | Name of sub_mb_type [mbPartIdx] | NumSubMbPart (sub_mb_type[mbPartIdx]) | SubMbPredMode (sub_mb_type[mbPartIdx]) | SubMbPartWIdth (sub_mb_type[mbPartIdx]) | SubMbPartWIdth (sub_mb_type[mbPartIdx]) |
|---|---|---|---|---|---|
| inferred | mb_type | 4 | Direct | 4 | 4 |
| 0 | B_Direct_8x8 | 1 | Pred_L0 | 4 | 4 |
| 1 | B_L0_8x8 | 1 | Pred_L1 | 8 | 8 |
| 2 | B_L1_8x8 | 1 | BiPred | 8 | 8 |
| 3 | B_Bi_8x8 | 1 | Pred_L0 | 8 | 8 |
| 4 | B_L0_8x4 | 2 | Pred_L0 | 8 | 4 |
| 5 | B_L0_4x8 | 2 | Pred_L1 | 4 | 8 |
| 6 | B_L1_8x4 | 2 | Pred_L1 | 8 | 4 |
| 7 | B_L1_4x8 | 2 | Pred_L1 | 4 | 8 |
| 8 | B_Bi_8x4 | 2 | BiPred | 8 | 4 |
| 9 | B_Bi_4x8 | 2 | Pred_L0 | 4 | 8 |
| 10 | B_L0_4x4 | 4 | Pred_L0 | 4 | 4 |
| 11 | B_L1_4x4 | 4 | Pred_L1 | 4 | 4 |
| 12 | B_Bi_4x4 | 4 | BiPred | 4 | 4 |

Figure 7:
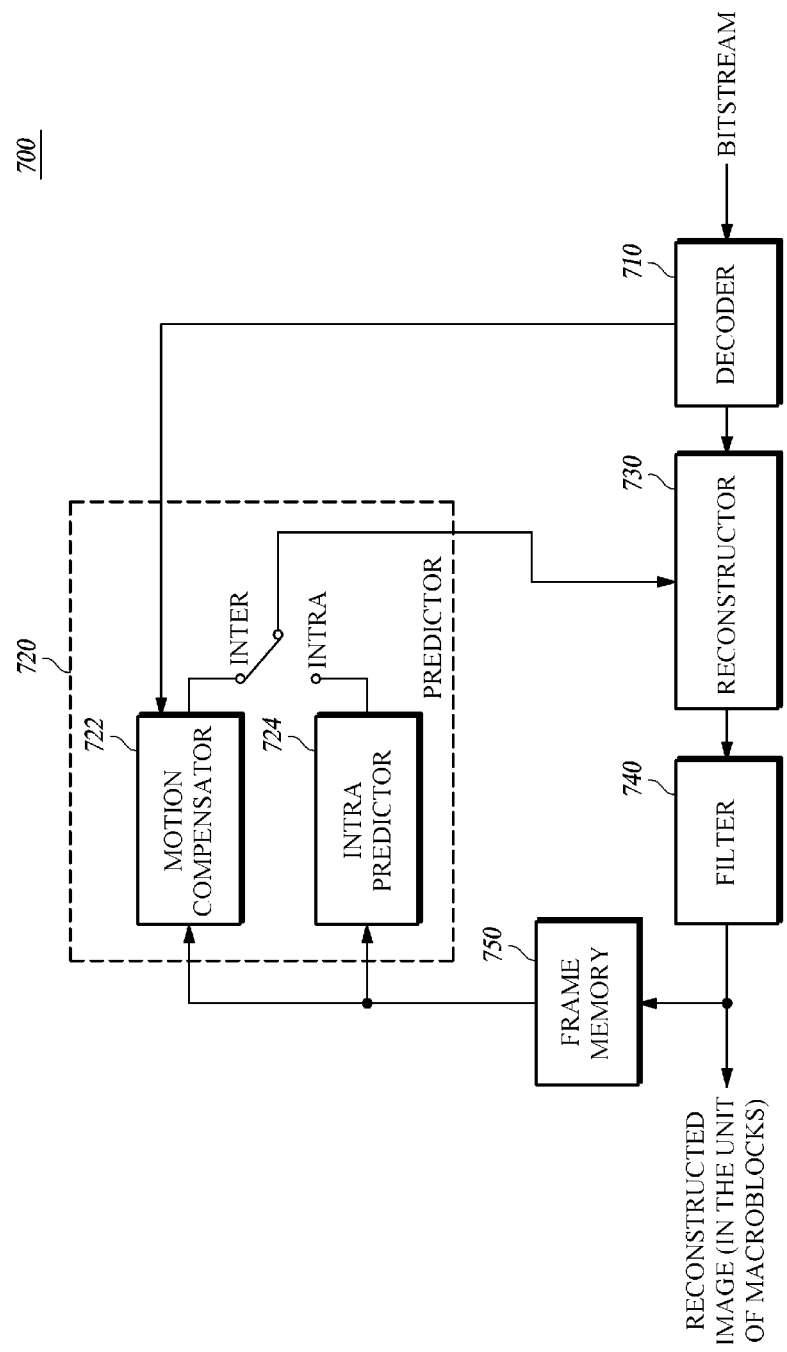
FIG. 7 is a schematic block diagram of a video decoding apparatus according to at least one embodiment of the disclosure.

FIG. 7 is a schematic block diagram of a video decoding apparatus according to at least one embodiment of the present disclosure.

The video decoding apparatus 700 according to at least one embodiment of the present disclosure may include a decoder 710, a predictor 720, a reconstructor 730, a filter 740, and a frame memory 750. The decoder 710 extracts three types of information required for a macroblock decoding from an input bitstream. Other components of the video decoding apparatus 700, such as the decoder 710, the predictor 720, the reconstructor 730, and the filter 740 comprise one or more processors and/or application-specific integrated circuits (ASICs). The frame memory 750 includes at least one non-transitory computer readable recording medium. The video decoding apparatus 700 further comprises input units (not shown in FIG. 7) such as one or more buttons, a touch screen, a mic and so on, and output units (not shown in FIG. 7) such as a display, an indicator and so on.

First, the decoder 710 entropy decodes and extracts macroblock type information on whether a macroblock, which is desired to be currently decoded, is an intra macroblock or an inter macroblock and subblock mode information indicating subblock modes of the macroblock.

Second, the decoder 710 entropy decodes and extracts information required for the prediction. In this event, data required for the prediction is different according to a macroblock type. When a reconstructed macroblock is the inter macroblock, the decoder 710 extracts reference picture information required for the motion compensation of respective subblocks and information on a motion such as a motion vector from the bitstream and decodes the extracted information. When the reconstructed macroblock is the intra macroblock, the decoder 710 extracts information of intra prediction modes of a luma component and a chroma component from the bitstream and decodes the extracted information.

Lastly, the decoder 710 decodes information required for a residual signal decoding. Specifically, the decoder 710 first decodes information indicating whether there is a transform coefficient, which is not "0", in each subblock and then decodes transform information indicating a type of a used transform and a quantized transform coefficient for blocks having the transform coefficient, which is not "0".

In decoding the transform information, the number of bits required for decoding the transform information is different according to a transform type, and the transform type is determined according to a macroblock type and a subblock size. 1 bit or 2 bits are decoded when there are three types of available transforms, and only 1 bit is decoded when there are two types of available transforms. Further, when the types of available transforms are fixed to one type, the transform information is not decoded.

If the macroblocks are the intra macroblocks and subblock sizes are equal to or larger than size 16×16, it is determined whether a transform having a size equal to that of the predicted block is used or a transform by which residual blocks are 4×4 transformed and then DC components are 4×4 transformed is used. A transform flag is not decoded for blocks using an intra prediction having a size smaller than size 16×16. In this event, a transform having a size equal to that of the predicted block is used.

When the macroblocks are inter macroblocks, 1 bit or 2 bits are extracted, through an entropy decoding, from each of blocks having a size equal to or larger than a size 16×16, by using one transform among a 4×4 transform, a 8×8 transform, and a 16×16 transform. In other cases, the transform flag is decoded in the unit of 16×16 blocks and subblocks within the 16×16 block all use the same transform. When the 16×16 block is divided into two subblocks of size 8×16, a reconstructed transform flag corresponds to one of the 4×4 transform, the 8×8 transform, and a 8×16 transform. When each block of size 16×16 is divided into two subblocks of size 16×8, the reconstructed transform flag indicates one of the 4×4 transform, the 8×8 transform, and a 16×8 transform. Further, when the 16×16 block is divided into four 8×8 blocks, information indicating whether the 4×4 transform is used or the 8×8 transform is used is extracted by decoding the transform flag. In other cases, the transform flag is not decoded and a transform type is set to the 4×4 transform.

The predictor 720 predicts a current macroblock, which is desired to be currently decoded, and may include a motion compensator 722 and an intra predictor 724. When the current macroblock is an inter macroblock, the motion compensator 722 generates a predicted macroblock by dividing the macroblock into subblocks in a reconstructed subblock mode decoded by the decoder 710 and fetching pixels corresponding to a size of subblocks within the current macroblock from the reference picture stored in the frame memory 750 by using the motion vector of each reconstructed subblock decoded by the decoder 710. When the current macroblock is the intra macroblock, the intra predictor 724 generates a predicted macroblock by predicting the current macroblock by using reconstructed neighboring pixel information already decoded according to the reconstructed intra prediction mode decoded by the decoder 710.

The reconstructor 730 inversely quantizes a quantized transform coefficient decoded by the decoder 710 and inversely transforms the transform coefficient by using a transform type extracted from the decoder 710, to generate a residual signal. And then, the reconstructor 730 generates a reconstructed macroblock by adding the generated residual signal and the predicted macroblock generated by the predictor 720. The generated reconstructed macroblock is filtered in the filter 740 and stored in the frame memory 750, and the filtered and stored macroblock is used for reconstructing a next macroblock or a next picture. As described above, the video encoding apparatus 600 and the video decoding apparatus 700 according to at least one embodiment of the present disclosure can encode and decode an image by using macroblocks of size 16×16 or more.

Hereinafter, data of an intra picture transmitted through a bitstream and a decoding method of the intra picture will be described with reference to FIGS. 20 and 21. In a case of the intra picture, a type and an order of data transmitted through the bitstream are as shown in FIGS. 20 and 21. First, a value of M×N_Block_type is obtained through an entropy decoding. And then, it is determined whether each macroblock is divided into four subblocks by using Table 1.

When a value of M×N_Block_type of the reconstructed macroblock is not "0", the intra prediction is performed in the unit of macroblocks and a prediction mode and CBP information can be grasped through the value of M×N_Block_type. Thereafter, prediction mode information and transform types of chroma components, QP_delta, and data required for reconstructing a residual block such as the quantized transform coefficient are decoded. However, data related to the residual block decoding are decoded only when CBP obtained through M×N_Block_type is not "0" (that is, only when there is a transform coefficient, which is not "0", in the macroblock).

A case where the value of M×N_Block_type of the reconstructed macroblock is "0" means that the macroblock is divided into four subblocks. When the divided subblocks have sizes equal to or larger than size 16×16, data in FIG. 20 are sequentially decoded for each subblock as shown in FIG. 20. When the divided subblocks have sizes smaller than size 16×16, data in FIG. 21 are sequentially decoded.

In a method of decoding transform information, a value of use_large_transform_flag is set by entropy decoding 1 bit for blocks having sizes equal to or larger than size 16×16. When the set value of use_large_transform_flag indicates that there is no use of a transform having a large size (for example, the value is "0"), a 4×4 transform is used and a Hardamard transform is used for DC components of transform coefficients obtained through the 4×4 transform in an inverse transform. When the set value of use_large_transform_flag indicates that there is the use of a transform having a large size (for example, the value is "1"), a transform having a size equal to that of the current block is used.

In a case of blocks having a size smaller than size 16×16, use_large_transform_flag indicates transform types and subblock sizes used in the prediction within a 16×16 block. In this event, use_large_transform_flag is encoded in the unit of 16×16 blocks only one time. When use_large_transform_flag indicates that there is no use of a transform having a large size (for example, the value is "0"), each 16×16 block is divided into sixteen blocks of size 4×4. Each 4×4 block is 4×4 intra predicted and a residual block is inversely 4×4 transformed. Further, when use_large_transform_flag indicates that there is the use of a transform having a large size (for example, the value is "1"), each 16×16 block is divided into four blocks of size 8×8. Each 8×8 block is intra predicted and a residual block is inversely 8×8 transformed.

Hereinafter, data of an intra picture transmitted through a bitstream and a decoding method of the intra picture will be described with reference to FIGS. 22 and 21. In a case of the intra picture, a type and an order of data transmitted through the bitstream are as shown in FIGS. 22 and 21. In a case of decoding a value of M×N_Block_Type equal to or larger than size 16×16, the picture P may be decoded using Tables 1 and 2, and the picture B may be decoded using Tables 1 and 3. Intra macroblocks within the picture P use Table 1, and index values are allocated values generated by adding "5" to values of M×N_Block_Type. For example, when a reconstructed value of M×N_Block_Type within the picture P is "6", the intra prediction is performed in the unit of M×N blocks and an intra prediction mode value is "0". Further, transform coefficients of both the luma component and the chroma component are in a mode 0. In the same way, macroblocks within the picture B use Tables 1 and 3, and values generated by adding "23" to values of M×N_Block_Type are allocated. In a case of a M×N block type equal to or smaller than size 8×8, the picture P may be decoded using Table 4, and the picture B may be decoded using Table 5.

In a process of decoding macroblocks within the picture P, a flag (M×N_Skip_flag) indicating whether the macroblocks are in a SKIP mode is decoded and it is determined whether the macroblocks are in the SKIP mode. When the macroblocks are in the SKIP mode, a motion compensation is performed using a predicted motion vector and a current macroblock decoding is completed based on an assumption that the predicted macroblock obtained through the motion compensation is a reconstructed macroblock. Then, next macroblock data is entropy decoded.

When the macroblock to be currently decoded is not in the SKIP mode or not the intra macroblock, a value of M×N_Block_Type is entropy decoded.

It is determined whether the macroblock is divided into four subblocks by using the decoded value of M×N_Block_Type and Table 2. That is, when the value of M×N_Block_Type of decoded macroblock is not "0", subblock sizes and modes are set according to Table 2 based on the value of M×N_Block_Type and reference picture information and an amount of motion vector information are decoded equal to the number of subblocks. Thereafter, it is determined whether there is a transform coefficient, which is not "0", by decoding a CBP. When there is the transform coefficient, which is not "0", Use_Large_tranform_flag indicating transform types, QP_delta, and the transform coefficient are decoded. A case where the value of M×N_Block_Type of the decoded macroblock is "0" means that the macroblock is divided into four subblocks. When sizes of the divided subblocks are equal to or larger than size 16×16, data in FIG. 22 are sequentially decoded for each subblock. When sizes of the divided subblocks are smaller than size 16×16, data in FIG. 23 are sequentially decoded.

A method of entropy decoding transform data required for a residual block decoding and extracting a transform type used in the encoder is different depending on block types and sizes as described below.

In a case of blocks of size 16×16 or more, a transform type selected by the encoder is one of 4×4, 8×8, and 16×16 transforms. In this event, when a value decoded by entropy decoding 1 bit indicates that a transform having a large size is not used (for example, the value is "0"), the 4×4 transform is used in an inverse transform as a method of decoding transform information. In a case where the decoded bit value indicates that the transform having a large size is used (for example, the value is "1"), if a second bit value decoded by entropy decoding 1 bit indicates that the transform having a large size is not used (for example, the value is "0"), the 8×8 transform is used in an inverse transform. On the other hand, the 16×16 transform is used in an inverse transform.

In a case where a block of size 16×16 is divided into two subblocks of size 16×8 or two subblocks of size 8×16, if a value decoded by entropy decoding 1 bit indicates that a transform having a large size is not used, the 4×4 transform is used as an inverse transform. In a case where the decoded value indicates that the transform having a large size is used, if a value decoded by further entropy decoding 1 bit indicates that the transform having a large size is not used, the 8×8 transform is used as an inverse transform. In a case where the secondly decoded bit value indicates that the transform having a large size is used, an inverse transform of size 16×8 is used when subblock sizes are 16×8 and an inverse transform of size 8×16 is used when subblock sizes are 8×16.

Hereinafter, as another embodiment of the present disclosure, an apparatus and a method for determining macroblock sizes, and available subblock types and sizes and then encoding and decoding a video according to the determination in order to efficiently encode and decode the video by using variable sized macroblocks will be described. The macroblocks refer to pixel blocks of size M×N (M and N are integers, where M is a horizontal size of the macroblock and N is a vertical size of the macroblock, and thus satisfying 0<M<a horizontal size of an input image and 0<N<a vertical size of an input image), and correspond to the encoding and decoding units.

A video encoding apparatus according to at least one embodiment of the present disclosure may include a candidate block type configuration unit, a video encoder, and a block type determiner.

The candidate block type configuration unit configures block type candidates for encoding an image by using macroblocks having a certain size. The block type may include one or more of a macroblock size, a minimum subblock size, and a subblock mode combination. That is, according to the typical video compression technology, since macroblock sizes are fixed to size 16×16, an image can be encoded or decoded after dividing the image into macroblocks having a fixed size. However, according to at least one embodiment of the disclosure and another embodiment of the present disclosure, since any macroblock size can be used, an image can be encoded after dividing the image in the unit of macroblocks having a predetermined size. Further, according to at least one embodiment of the present disclosure, macroblock sizes, which are the encoding and/or decoding units, may be differently selected for each picture, slice, or macroblock layer.

A high resolution image may be efficiently encoded in the unit of large blocks. However, the encoding efficiency is not always improved whenever all areas of the image (block, slice, picture, etc.) are encoded using the largest blocks. For example, in a case where characteristics of one picture of the image are monotonous, it can be efficient to encode the image in the unit of macroblocks having a large size. However, in a case where characteristics of one picture are complex, it may be efficient to encode the image in the unit of macroblocks having a small size. Accordingly, in another embodiment of the present disclosure, macroblock sizes, by which an image can be efficiently encoded, are determined, the image is encoded in the unit of macroblocks having the selected size, and the image is decoded and reconstructed using macroblock sizes identified by information included in the bitstream.

Meanwhile, one macroblock may be divided into a plurality of subblocks for the prediction and the transform. As macroblock sizes are enlarged, a minimum subblock size may be changed. For example, according to the typical video compression technology, a subblock of size 4×4 corresponds to a minimum subblock for the prediction and the transform in a macroblock of size 16×16. However, in a case of encoding an image by using macroblocks of size 64×64, if the prediction or the transform is performed using subblocks of size 4×4, the encoding efficiency may be deteriorated depending on image characteristics because excessively small subblocks are used for the encoding. Therefore, it may be efficient to determine the subblocks of size 8×8 or size 16×16 as the minimum subblock size. Accordingly, in another embodiment of the present disclosure, a minimum subblock size, by which an image can be efficiently encoded by encoding the image in advance, is determined, the image is encoded using only subblocks of sizes equal to or larger than the corresponding determined size, and the image is decoded and reconstructed using subblocks of sizes equal to or larger than the minimum subblock size identified by information included in the bitstream.

Further, as macroblock sizes are enlarged, block modes of subblocks into which macroblocks are divided are greatly diversified, and thus the encoding efficiency may be deteriorated. For example, according to the typical video compression technology, subblock modes for a macroblock of size 16×16 may include 16×16, 16×8, 8×16, 8×8, 8×4, 4×8, and 4×4. However, in a case of encoding an image by using macroblocks of size 64×64, many more subblock modes including 64×64, 64×32, 32×32, 32×16, 16×32, 16×16, etc. can be used, so that an amount of bits for expressing or encoding information on subblocks divided from each macroblock is enlarged and thus the encoding efficiency may be deteriorated. Accordingly, it may be efficient to predetermine a combination of available subblock modes according to the unit of entire images, the unit of pictures, the intra mode, or the inter mode and then to remove subblock modes, which are not used.

Accordingly, in another embodiment of the present disclosure, a subblock mode combination, which can efficiently encode an image, are determined, the image is encoded using only a subblock mode within the determined subblock mode combination, and the image is decoded and reconstructed using only a subblock mode within a subblock mode combination identified by information included in a bitstream. For example, when a subblock mode combination for an entire image is determined as 32×16, 16×16, and 16×8, other subblock modes (e.g. 64×64, 32×64, 64×32, 32×32, 8×8, 4×4, etc.) except for subblock modes 32×16, 16×16, and 16×8 may not be included in the universe for expressing information on subblock sizes for a corresponding area or macroblock, so that it is possible to reduce an amount of bits to express or encode information on subblock modes. For example, in Tables 1 to 5, allocated values or bits are changed although a mode of the same meaning is encoded because unnecessary syntaxes are not used based on macroblock sizes, minimum subblock sizes, and available subblock modes, and code values allocated to such syntaxes are removed.

Block types such as a macroblock size, a minimum subblock size, a subblock mode combination, and so on are determined in the unit of macroblocks, slices, or pictures of an image, or in the unit of Group of Picture (GOP) or entire image sequences, and information on such block types may be included in a bitstream header. For example, when macroblock sizes are determined in the unit of pictures, information on the macroblock sizes may be included in a picture header of the bitstream.

A method of encoding and/or decoding types of subblocks within a macroblock may be different according to a macroblock size, a minimum subblock size, and a subblock mode combination.

A method of encoding types of subblocks within a macroblock may be different according to a macroblock size or a minimum subblock size.

Hereinafter, various methods of encoding macroblock sizes according to the present disclosure will be described. A first method of encoding macroblock sizes is described below.

A flag (Set_MBsize_flag) indicating whether to transmit information on macroblock sizes may be included in a sequence header, a header of each picture, or a slice header. The macroblock sizes may be either transmitted or not according to a value of the flag. In a case of not transmitting the macroblock sizes, macroblocks having a predetermined size, for example, blocks of size 16×16 are used as macroblocks.

If macroblock sizes are designated, information on the macroblock sizes is transmitted. In this event, macroblocks having a certain size, of which horizontal sizes and vertical sizes are separately set, may be used. Alternatively, in a case of using square macroblocks, only information on one side of the square macroblock is encoded and then may be transmitted to the decoding apparatus.

Size values of macroblocks to be encoded may be designated as actual macroblock sizes or a value indicating the number of times, by which a macroblock is to be enlarged or reduced with respect to a predetermined size, may be transmitted. Further, macroblock size values may be represented using smaller bits through applying a log function to the macroblock size values instead of directly encoding the macroblock size values. For example, a value of $\log_2$ (selected MBsize/X) (X is a certain positive integer, which is a multiple of 2) is encoded. In this case, a value of X may be selected as an available minimum macroblock size. For example, if the available minimum macroblock size is 8×8, it is preferable to select "8" as the value of X. In this event, "0" is encoded when a current macroblock is a block of size 8×8, and "1" is encoded when the current macroblock is a block of size 16×16. If the available minimum macroblock size is 16×16, it is preferable to select "16" instead of "8" as the value of X. In this event, "0" is encoded when the current macroblock is a block of size 16×16, and "1" is encoded when the current macroblock is a block of size 32×32. Accordingly, a current macroblock size can be represented using bits smaller than bits used for encoding a large number such as 8, 16, or 32.

Further, magnifications of the horizontal size and the vertical size may be encoded, respectively.

Alternatively, the size values of macroblocks to be encoded may be index values of a prearranged table between the encoder and the decoder.

In this event, macroblock sizes to be transmitted may be encoded using various binary coding methods such as a unary code, a truncated unary code, and an exponential (Exp) Golomb code.

Hereinafter, it is not described to separately set a horizontal size and a vertical size for the convenience of descriptions, but it is applicable to separately set the horizontal size and the vertical size. Further, although it is exemplified to encode data on a sequence header and a picture header, the data may be encoded on a slice header or a macroblock header.

An example of syntax according to the first method of encoding the macroblock sizes is as follows.

```
Set_MBsize_Flag
if(Set_MBsize_Flag == 1)
{
MBsize
}
or
Set_MBsize_Flag
if(Set_MBsize_Flag == 1)
{
MBsize_width
MBsize_height
}
```

Alternatively, macroblock sizes may be transmitted to the video decoding apparatus in every sequence, picture, slice, or macroblock header without encoding the flag (Set_MBsize_flag) indicating to transmit information on the macroblock sizes.

Hereinafter, a second method of encoding macroblock sizes will be described.

According to the second method, size M×N is set as a reference macroblock size, and a flag indicating whether to use the reference macroblock size is encoded in every picture, slice, or macroblock header. When the reference macroblock size is not used, a selected macroblock size is encoded. Alternatively, after a flag indicating whether to set the reference macroblock size is encoded in the sequence header, a predetermined size, for example, size 16×16 is used as the reference macroblock size if the reference macroblock size is not set, and the reference macroblock size may be encoded and included in the sequence header if the reference macroblock size is set.

In a method of encoding a value of default_MBsize, which is information indicating the reference macroblock size, or a value of MB_size, which is information indicating a current macroblock size, an actual macroblock size may be designated or a value indicating the number of times, by which a macroblock is to be enlarged or reduced with respect to a predetermined size, may be transmitted. Alternatively, as described in the aforementioned first method, macroblock size values may be represented using smaller bits through applying a log function to the macroblock size values instead of directly encoding the macroblock size values.

Magnifications of the horizontal size and the vertical size may be encoded, respectively.

Alternatively, the size values of macroblocks to be encoded may be index values of a prearranged table between the encoder and the decoder.

In this event, macroblock sizes to be transmitted may be encoded using various binary coding methods such as a unary code, a truncated unary code, and an exponential (Exp) Golomb code.

An example of syntax according to the aforementioned second method of encoding the macroblock sizes is as follows.

```
Sequence, picture, or slice header Set_defaultMBsize_Flag
if(Set_MBsize_Flag == 1)
{
default_MBsize
}
Picture, slice, or macroblock header
use_default_MBsize_flag
if(use_default_MBsize_flag == 0)
{
MB_size
}
```

Hereinafter, a second method of encoding macroblock sizes will be described.

According to the third method, size M×N is set as a reference macroblock size, and a flag indicating whether to use the reference macroblock size is encoded in every macroblock header and transmitted to the video decoding apparatus. When the flag indicates that the reference macroblock size is used, a block having the same size as the reference macroblock size is selected as a current macroblock. However, when the flag indicates that the reference macroblock size is not used, a block having a size enlarged or reduced by a predetermined ratio with respect to the reference macroblock size is selected as the current macroblock in an encoding or a decoding process. For example, a block having a horizontal size and a vertical size enlarged or reduced twice from a horizontal size and a vertical size of the reference macroblock may be selected as the current macroblock.

In a case where there are various enlarging ratios or reducing ratios, various ratios may be represented by setting a length of the flag to 2 bits or more. Alternatively, information indicating an enlarging ratio or a reducing ratio may be additionally encoded in addition to the flag indicating whether to use the reference macroblock size.

When the flag indicates that the reference macroblock size is not used and a block having a size enlarged with respect to the reference macroblock size is selected as the current macroblock, the reference macroblock size corresponds to a minimum macroblock size available for a current bitstream encoding or decoding. On the contrary, when the flag indicates that the reference macroblock size is not used and a block having a size reduced with respect to the reference macroblock size is selected as the current macroblock, the reference macroblock size corresponds to a maximum macroblock size available for the current bitstream encoding or decoding.

The video decoding apparatus can select the current macroblock size by using the flag indicating whether to use the reference macroblock size and/or additional information indicating an enlargement or a reduction by a predetermined ratio with respect to the reference macroblock size.

According to at least one embodiment of the present disclosure, the flag indicating whether to set the reference macroblock size may be included in the sequence header of the bitstream. If the reference macroblock size is not set, it may be arranged in advance to use a predetermined size, for example, size 16×16 as the reference macroblock size.

When the reference macroblock size is set and then the set reference macroblock size is signaled to the video decoding apparatus, information indicating the reference macroblock size is encoded and may be included in the sequence header, and so on. According to at least one embodiment of the present disclosure, the video encoding apparatus can signal information indicating a maximum macroblock size available for a current bitstream encoding or decoding to the video decoding apparatus as the information indicating the reference macroblock size. According to at least one embodiment of the present disclosure, the video encoding apparatus can signal information indicating a minimum macroblock size available for the current bitstream encoding or decoding to the video decoding apparatus as the information indicating the reference macroblock size. According to yet another embodiment of the present disclosure, the video encoding apparatus can signal information indicating both the maximum macroblock size and the minimum macroblock size available for the current bitstream encoding or decoding to the video decoding apparatus as the information indicating the reference macroblock size.

In a method of encoding default_MBsize, which is the information indicating the reference macroblock size, an actual macroblock size may be designated or a value indicating the number of times, by which a macroblock is to be enlarged or reduced from a predetermined size, may be transmitted. Alternatively, as described in the aforementioned first method, macroblock size values can be represented using smaller bits through applying a log function to the macroblock size values instead of directly encoding the macroblock size values.

More specifically, for example, when default_MBsize indicates the maximum macroblock size available for the current bitstream encoding or decoding, a value of $\log_2$ (X/default_MBsize) (X is a certain positive integer, which is a multiple of 2) is encoded. At this event, the available maximum macroblock size may be selected as a value of X. Alternatively, when default_MBsize indicates the minimum macroblock size available for the current bitstream encoding or decoding, a value of $\log_2$ (default_MBsize/X) (X is a certain positive integer, which is a multiple of 2) is encoded. In this event, the available minimum macroblock size may be selected as a value of X.

Magnifications of the horizontal size and the vertical size may be encoded, respectively.

Alternatively, the size values of macroblocks to be encoded may be index values of a prearranged table between the encoder and the decoder.

In this event, macroblock sizes to be transmitted may be encoded using various binary coding methods such as a unary code, a truncated unary code, and an exponential (Exp) Golomb code.

Hereinafter, a fourth method of encoding macroblock sizes will be described.

According to the fourth method, after a flag indicating whether to use the reference macroblock size and a macroblock size selected in a case where the reference macroblock size is not used are encoded in a first picture, a flag indicating whether to use a macroblock size of a previous picture and a macroblock size of a current picture in a case where the macroblock size of the previous picture is not used may be encoded from a second picture.

In a method of encoding default_MB size, which is the information indicating the reference macroblock size and MB_size, which is the information indicating the current macroblock size, an actual macroblock size may be designated and a value indicating the number of times, by which a macroblock is to be enlarged or reduced from a predetermined size, may be transmitted. Alternatively, as described in the aforementioned first method, macroblock size values can be represented using smaller bits through applying a log function to the macroblock size values instead of directly encoding the macroblock size values.

Further, magnifications of the horizontal size and the vertical size may be encoded, respectively. Alternatively, the size values of macroblocks to be encoded may be index values of a prearranged table between the encoder and the decoder.

In this event, macroblock sizes to be transmitted may be encoded using various binary coding methods such as a unary code, a truncated unary code, and an exponential (Exp) Golomb code.

An example of a syntax according to the aforementioned fourth method of encoding the macroblock sizes is as follows.

```
First picture
use_default_MBsize_flag
if(use_default_MBsize_flag == 0)
{
MB_size
}
From second picture
use_prevPic_MBsize_flag
if(use_prevPic_MBsize_flag == 0)
{
MB_size
}
```

Hereinafter, a fifth method of encoding macroblock sizes will be described.

According to the fifth method, different macroblock sizes are used for an intra picture and an inter picture. That is, a macroblock size for the intra picture and a macroblock size for the inter picture are encoded in the sequence header. Alternatively, each macroblock size according to a picture type can be encoded only in headers of a first intra picture and a first inter picture.

A method of encoding information for the macroblock size of the intra picture and the macroblock size of the inter picture may be used in combination with the aforementioned methods.

```
Sequence header
Set_intraMBsize_Flag
Set_interMBsize_Flag
if(Set_interMBsize_Flag == 1)
{
intraMBsize
}
if(Set_interMBsize_Flag == 1)
{
interMBsize
}
```

Hereinafter, various methods of decoding macroblock sizes according to the present disclosure will be described.

First, a decoding method according to the first method of encoding macroblock sizes will be described.

When a flag (Set_MBsize_flag) indicating whether to transmit information for the macroblock size is included, the flag (Set_MBsize_flag) indicating whether to transmit the information for the macroblock size is entropy decoded in an arranged position such as a sequence header, a header of each picture, a slice header, etc. When the encoded flag has a value indicating that the macroblock size is not transmitted, a macroblock having a predetermined size agreed with the encoder, for example, a 16×16 block is used as the macroblock.

When the decoded macroblock size designation flag (Set_MBsize_flag) indicates that the macroblock size is designated, the macroblock size is entropy decoded and extracted through a method agreed with the encoder among various entropy decoding methods such as a unary code, a truncated unary-code, exponential (Exp)-golomb code, etc.

When a horizontal size and a vertical size of the macroblock are separately set and then transmitted, the horizontal size and the vertical size may be obtained by entropy decoding each of the sizes. Alternatively, if a square macroblock is used, only information indicating one side of the square macroblock may be entropy decoded.

A decoded value may be designated as the actual macroblock size, and a value indicating the number of times, by which a macroblock is to be enlarged or reduced from a predetermined size, may be transmitted. Further, when the encoder encodes a value generated by applying a log function to the macroblock size value, the macroblock size may be set by applying an exponential function to the entropy decoded value. For example, when the encoder encodes y, which is a value of $\log_2$ (MBsize selected in the encoder/X) (X is a certain positive integer, which is a multiple of 2), the decoder entropy decodes the y and can obtain the macroblock size selected in the encoder by multiplying $2^y$ and X. Here, X corresponds to a value agreed between the encoder and the decoder or a value extracted from the bitstream before a macroblock size decoding. When a minimum macroblock size available for X is selected and used and the available minimum macroblock size is 8×8, the macroblock size is set as 8×8 if a value of decoded y is "0", and the macroblock size is set as 16×16 if the value of decoded y is "1". When the available minimum macroblock size is 16×16, "16" instead of "8" is used as X, and the macroblock size is set as 16×16 if the value of decoded y is "0".

When ratios of the horizontal size and the vertical size are separately decoded in the encoder, the macroblock size may be obtained by separately entropy decoding a ratio of the horizontal size and a ratio of the vertical size, In addition, when an index value of a prearranged table between the encoder and the decoder is encoded, the macroblock size may be obtained by using a decoded value as the index value of the table.

In this event, macroblock sizes to be transmitted may be decoded using various binary coding methods such as a unary code, a truncated unary code, and an exponential (Exp) Golomb code. Hereinafter, it is not described to separately decode and extract a horizontal size and a vertical size for the convenience of descriptions, but it is applicable to separately extract the horizontal size and the vertical size. Further, although it is exemplified to decode data on a sequence header and a picture header, the macroblock size may be decoded on a slice header or a macroblock header when the encoder encodes the macroblock size in the slice header or the macroblock header.

Hereinafter, a decoding method according to the second method of encoding macroblock sizes will be described.

According to the second method, a size M×N agreed with the encoder is set as the reference macroblock size, and a flag indicating whether to use the reference macroblock size is entropy decoded in a header of each picture, a slice header, and a macroblock header. When a value of the decoded flag indicates that the reference macroblock size is not used, information related to the macroblock is extracted by entropy decoding macroblock size information, and the macroblock size is set. A case where the value of the decoded flag indicates that the reference macroblock size is used means that the macroblock size information is not included in the bitstream, so that a preset reference macroblock size is set as the macroblock size and a series of decoding processes are performed.

When the reference macroblock size is included in the sequence header and transmitted from the encoder to the decoder, the reference macroblock size may be extracted from an arranged position such as the sequence header, etc. within the bitstream. Here, the reference macroblock size or the current macroblock size is allocated an entropy decoded value, and the macroblock size may be obtained by scaling (enlarging or reducing) a predetermined size with the entropy decoded value. Alternatively, as described in the aforementioned first decoding method, when the encoder encodes a value generated by applying a log function to the macroblock size value, the macroblock size value may be obtained by using an exponential function.

When the encoder separately decodes ratios of a horizontal size and a vertical size, the macroblock size may be obtained by separately entropy decoding the ratios of the horizontal size and the vertical size.

In addition, when an index value of a prearranged table between the encoder and the decoder is encoded, the macroblock size may be obtained by using a decoded value as the index value of the table.

In this event, macroblock sizes to be transmitted may be decoded using various binary coding methods such as a unary code, a truncated unary code, and an exponential (Exp) Golomb code.

Hereinafter, a decoding method according to the third method of encoding macroblock sizes will be described.

According to the third method, the video decoding apparatus extracts a flag indicating whether to use the reference macroblock size and/or additional information indicating an enlargement or a reduction by a predetermined ratio with respect to the reference macroblock size from the bitstream, and then the macroblock size may be extracted using the above information.

First, a size N×N is set as the reference macroblock size and the flag indicating whether to use the reference macroblock size is decoded in every header of each picture, slice header, and macroblock header. When the flag indicates that the reference macroblock size is used, the current macroblock size is equally set to the reference macroblock size and a decoding is performed by using the set macroblock size in the unit of macroblocks. However, when the flag indicates that the reference macroblock size is not used, a value enlarged or reduced with respect to the reference macroblock size by a predetermined ratio agreed with the encoder is set as the current macroblock size and a decoding is performed in the unit of macroblocks. For example, a size enlarged or reduced twice from the horizontal size and the vertical size of the reference macroblock may be set as the current macroblock size.

When the encoder uses various enlarging or reducing ratios, includes a selected ratio in the bitstream, and encodes the bitstream, the decoder can obtain various ratios by decoding the number of bits agreed with the encoder from the bitstream in a flag entropy decoding.

Alternatively, when information indicating an enlarging ratio or a reducing ratio is included in the bitstream and encoded in addition to the flag indicating whether to use the reference macroblock size, the enlarging ratio or the reducing ratio may be either decoded or not according to a value of the flag indicating whether to use the reference macroblock size after the flag is decoded. If the enlarging ratio or the reducing ratio is not decoded, the reference macroblock size is set as the current macroblock size and then decoding processes are performed.

When the decoded flag indicates that the reference macroblock size is different from the current macroblock size and the decoded ratio is the enlarging ratio, the reference macroblock size is set as the minimum macroblock size available for the current bitstream encoding or decoding, and then a size enlarged from the reference macroblock size with the entropy decoded ratio is set as the current macroblock size. On the contrary, when the entropy decoded ratio is the reducing ratio, the reference macroblock size is set as the maximum macroblock size available for the current bitstream encoding or decoding, and then a size reduced with respect to the reference macroblock size with the entropy decoded ratio is set as the current macroblock size.

According to at least one embodiment of the present disclosure, when a flag indicating whether to set the reference macroblock size is included in the sequence header of the bitstream and then transmitted, the decoder entropy decodes the flag from the sequence header. And then, when the flag indicates that the reference macroblock size is set, the decoder extracts reference macroblock size information from an arranged position such as the sequence header of the bitstream and sets the reference macroblock size by using the extracted information. When the flag indicates that the reference macroblock size is not set, a predetermined size arranged in advance between the encoder and the decoder, for example, a size 16×16 may be used as the reference macroblock size.

According to at least one embodiment of the present disclosure, the video decoding apparatus extracts information indicating the maximum macroblock size available for the current bitstream encoding or decoding from the bitstream and can use the extracted information in setting the reference macroblock size. According to at least one embodiment of the present disclosure, the video decoding apparatus extracts information indicating the minimum macroblock size available for the current bitstream encoding or decoding from the bitstream and can use the extracted information in setting the reference macroblock size. According to yet another embodiment of the present disclosure, the video decoding apparatus extracts information indicating both the maximum macroblock size and the minimum macroblock size available for the current bitstream encoding or decoding from the bitstream and can use the extracted information in setting the reference macroblock size.

In a method of decoding default_MBsize, which is the information indicating the reference macroblock size, an entropy decoded value itself can be set as a reference macroblock size value, and the reference macroblock size can be obtained through an enlargement or a reduction from a predetermined size by using the entropy decoded value as an enlarging ratio or a reducing ratio. Alternatively, as described in the aforementioned first decoding method, when the encoder encodes a value generated by applying a log function to the macroblock size value, the macroblock size value may be obtained using an exponential function.

More specifically, for example, when default_MBsize indicates the maximum macroblock size available for the current bitstream encoding or decoding and the encoder encodes y, which is a value of $\log_2$ (X/default_MBsize) (X is a certain positive integer, which is a multiple of 2), the decoder can obtain default_MBsize by entropy decoding y and dividing X by $2^y$. In this event, X may be a value agreed between the encoder and the decoder like the available maximum macroblock size or a value extracted from the bitstream before decoding default_MBsize.

Alternatively, when default_MBsize indicates the minimum macroblock size available for the current bitstream encoding or decoding and the encoder encodes y, which is a value of $\log_2$ (default_MBsize/X) (X is a certain positive integer, which is a multiple of 2), the decoder extracts y from the bitstream through an entropy decoding. And then, the decoder sets a value generated by multiplying X and $2^y$ as default_MBsize. In this event, X may be a value agreed between the encoder and the decoder like the available minimum macroblock size or a value extracted from the bitstream before decoding default_MBsize.

Further, when ratios of the horizontal size and the vertical size are separately decoded in the encoder, the reference macroblock size may be obtained by separately entropy decoding the ratios of the horizontal size and the vertical size.

In addition, when an index value of a prearranged table between the encoder and the decoder are encoded, the macroblock size may be obtained by using a decoded value as the index value of the table.

In this event, the reference macroblock size may be decoded using various binary coding methods such as a unary code, a truncated unary code, and an exponential (Exp) Golomb code.

Hereinafter, a decoding method according to the fourth method of encoding macroblock sizes will be described.

According to the fourth method, after a flag indicating whether to use the reference macroblock size and macroblock size information in a case where the reference macroblock size is not used are entropy decoded in a first picture, a macroblock size required for a first picture decoding is obtained by using the decoded macroblock size information.

When the flag indicating whether to use the reference macroblock size means that the reference macroblock size is used, the macroblock size is set to the same size as the reference macroblock size and then the first picture is decoded.

From a second picture, after decoding a flag indicating whether to use a macroblock size of a previous picture as the current macroblock size, macroblock size information for decoding the current picture is decoded when the macroblock size of the previous picture is not used. When the macroblock size of the previous picture is used for decoding the current picture, a macroblock size is set to the same size as the macroblock size of the previous picture and the second picture is decoded.

In a method of decoding default_MBsize, which is the information indicating the reference macroblock size, or MB_size, which is information indicating the macroblock size of the current picture, an entropy decoded value can be used as the macroblock size and the macroblock size can be obtained through an enlargement or a reduction from a predetermined size by using the entropy decoded value as an enlarging ratio or a reducing ratio. Alternatively, as described in the aforementioned first decoding method, when the encoder encodes a value generated by applying a log function to the macroblock size value, the macroblock size value may be obtained using an exponential function.

Further, when ratios of the horizontal size and the vertical size are separately decoded in the encoder, the reference macroblock size may be obtained by separately entropy decoding the ratios of the horizontal size and the vertical size.

When an index value of a prearranged table between the encoder and the decoder is encoded, the macroblock size may be obtained by using a decoded value as the index value of the table.

In this event, the reference macroblock size may be decoded using various binary coding methods such as a unary code, a truncated unary code, and an exponential (Exp) Golomb code.

Hereinafter, a decoding method according to the fifth method of encoding macroblock sizes will be described.

According to the fifth method, macroblock sizes of the intra picture and the inter picture are extracted from positions, which are agreed between the encoder and the decoder, within the bitstream, respectively, and a macroblock size is set according to the picture type.

Flags indicating whether to decode a macroblock size for the intra picture and indicating whether to decode a macroblock size for the inter picture are reconstructed in the sequence or the picture header, respectively, and then the macroblock size for the intra picture or the inter picture is decoded according to a value of the flag through the bitstream or the image is reconstructed using an arranged macroblock size.

A method of decoding information on macroblock sizes of the intra picture and the inter picture may be used in combination with the aforementioned decoding methods according to the aforementioned encoding methods.

Hereinafter, various methods of encoding a selected minimum subblock size according to the present disclosure will be described. One macroblock may be divided into a plurality of subblocks for the prediction or the transform. Macroblocks according to the present disclosure can have variable sizes and information on the macroblock sizes may be encoded using the aforementioned various methods.

A first method of encoding a minimum subblock size is first described. A flag (Set_minBlockSize_flag) indicating whether to transmit a minimum subblock size may be included in the sequence header or the header of each picture. The minimum subblock size may be either transmitted or not depending on a value of the flag. If the minimum subblock size is not transmitted, a minimum subblock having a predetermined size, for example, a 4×4 block is used as the minimum subblock size.

When the minimum subblock size is designated, information on the minimum subblock size is transmitted. In this event, it is possible to use a minimum subblock having a certain size if a horizontal size and a vertical size of the minimum subblock size are separately set. Alternatively, when a square is used for the minimum subblock, only information on one side of the square is encoded and then transmitted to the decoding apparatus.

A minimum subblock size value to be encoded may be designated as an actual minimum subblock size, and a value indicating the number of times, by which a macroblock is to be enlarged or reduced from a predetermined size, may be transmitted. Further, the minimum subblock size value may be represented using smaller bits through applying a log function to the minimum subblock size value instead of directly encoding the minimum subblock size value. For example, a value of $\log_2$ (selected minimum subblock size/X) (X is a certain positive integer, which is a multiple of 2) is encoded. In this event, an available minimum subblock size may be selected as a value of X. For example, if the available minimum subblock size is 4×4, it is preferable to select the value of X as "4". In this event, "00" is encoded when a current minimum subblock size is 4×4, and "1" is encoded when the current minimum subblock size is 8×8. When the available minimum subblock size is 8×8, it is preferable to select the value of X as "8" instead of "4". In this event, "0" is encoded when the current minimum subblock size is 8×8, and and "1" is encoded when the current minimum subblock size is 4×4. Accordingly, the current macroblock size may be represented using bits smaller than bits used for encoding a number such as 4, 8, or 16.

Ratios of the horizontal size and the vertical may be separately encoded.

Hereinafter, it is not described to separately set the horizontal size and the vertical size for the convenience of descriptions, but it is applicable to separately set the horizontal size and the vertical size. Further, although it is exemplified to encode data on the sequence header and the picture header, the data may be encoded on the slice header or the macroblock header.

An example of syntax according to the aforementioned first method of encoding the minimum subblock size is as follows.

```
Set_minBlockSize_flag
If(Set_minBlockSize_flag == 1)
{
minBlockSize
}
or
Set_minBlockSize_flag
If(Set_minBlockSize_flag == 1)
{
minBlockSize_Width
minBlockSize_height
}
```

Alternatively, the minimum subblock size may be transmitted to the video decoding apparatus in every sequence header, picture header, slice header, or macroblock header without encoding a flag (Set_minBlockSize_flag) indicating whether to transmit information on the minimum subblock size.

Hereinafter, a second method of encoding the minimum subblock size will be described.

According to the second method, a selected minimum subblock size is encoded when a M×N size is set as a reference minimum subblock size, a flag indicating whether to use the reference minimum subblock size is encoded in every slice header, macroblock header, or header of each picture, and the reference minimum subblock size is not used. Alternatively, after a flag indicting whether to set the reference minimum subblock size is encoded in the sequence header, a predetermined size, for example, a size 4×4 is used as the reference minimum subblock size if the reference minimum subblock size is not set, and the reference minimum subblock size is encoded and may be included in the sequence header if the reference minimum subblock size is set.

In a method of encoding default_minBlockSize, which is information indicating the reference minimum subblock size, or minBlockSize, which is information indicating the current minimum subblock size, an actual minimum subblock size may be designated and a value indicating the number of times, by which a macroblock is to be enlarged or reduced from a predetermined size, may be transmitted. Alternatively, as described in the aforementioned first method, the minimum subblock size value may be represented using smaller bits through applying a log function to the minimum subblock size value instead of directly encoding the minimum subblock size value.

Magnifications of the horizontal size and the vertical size may be encoded, respectively.

Alternatively, the minimum subblock size value may be an index value of a prearranged table between the encoder and the decoder.

In this event, the minimum subblock size to be transmitted may be encoded using various binary coding methods such as a unary code, a truncated unary code, and an exponential (Exp) Golomb code.

An example of syntax according to the aforementioned second method of encoding the minimum subblock size is as follows.

```
Sequence header, picture header, or slice header
Set_defalut minBlockSize_Flag
if(Set_default minBlockSize_Flag == 1)
{
Default_minBlockSize
}
Picture header, slice header, or macroblock header
use_default_minBlockSize_flag
if(use_default_minBlockSize_flag == 0)
{
minBlockSize
}
```

Hereinafter, a third method of encoding the minimum subblock size will be described.

According to the third method, a size M×N is set as the reference minimum subblock size, and a flag indicating whether to use the reference minimum subblock size is encoded in every header of each picture, slice header, or minimum subblock header and transmitted to the video decoding apparatus. When the flag indicates that the reference minimum subblock size is used, a block having the same size as the reference minimum subblock size is selected as a current minimum subblock. However, when the flag indicates that the reference minimum subblock size is not used, a block having a size enlarged or reduced by a predetermined ratio with respect to the reference minimum subblock size is selected as the current minimum subblock in an encoding or a decoding process. For example, a block having a horizontal size and a vertical size twice larger or twice smaller than the horizontal size and the vertical size of the reference minimum subblock may be selected as the current minimum subblock.

When there are various enlarging or reducing ratios, various ratios may be represented by making a length of the flag larger than 2 bits. Alternatively, information indicating the enlarging ratio or the reducing ratio may be additionally encoded in addition to the flag indicating whether to use the reference minimum subblock size.

When the flag indicates that the reference minimum subblock size is not used and a block having a size enlarged from the reference minimum subblock size is selected as the current minimum subblock, the reference minimum subblock size corresponds to a minimal minimum subblock size available for the current bitstream encoding or decoding. On the contrary, when the flag indicates that the reference minimum subblock size is not used and a block having a size reduced with respect to the reference minimum subblock size is selected as the current minimum subblock, the reference minimum subblock size corresponds to a maximal minimum subblock size available for the current bitstream encoding or decoding.

The video decoding apparatus can select the current minimum subblock size by using the flag indicating whether to use the reference minimum subblock size and/or additional information indicating an enlargement or a reduction by a predetermined ratio with respect to the reference minimum subblock size.

According to at least one embodiment of the present disclosure, the flag indicating whether to set the reference minimum subblock size may be included in the sequence header. If the reference minimum subblock size is not set, it may be prearranged to use a predetermined size, for example, a size 16×16 as the reference minimum subblock size.

When the reference minimum subblock size is set and signaled to the video decoding apparatus, information on the reference minimum subblock size is encoded and may be included in the sequence header. According to at least one embodiment of the present disclosure, the video encoding apparatus can signal information indicating the maximal minimum subblock size available for the current bitstream encoding or decoding to the video decoding apparatus as the information on the reference minimum subblock size. According to at least one embodiment of the present disclosure, the video encoding apparatus can signal information indicating the minimal minimum subblock size available for the current bitstream encoding or decoding to the video decoding apparatus as the information on the reference minimum subblock size. According to yet another embodiment of the present disclosure, the video encoding apparatus can signal information on both the maximal minimum subblock size and the minimal minimum subblock size available for the current bitstream encoding or decoding to the video decoding apparatus as the information on the reference minimum subblock size.

In a method of encoding default_minBlockSize, which is the information on the reference minimum subblock size, the actual minimum subblock size may be designated and a value indicating the number of times, by which a subblock is to be enlarged or reduced from a predetermined size, may be transmitted. Alternatively, as described in the aforementioned first method, the minimum subblock size value may be represented using smaller bits through applying a log function to the minimum subblock size value instead of encoding directly the minimum subblock size value.

More specifically, for example, when default_minBlockSize indicates the maximal minimum subblock size available for the current bitstream encoding or decoding, a value of $\log_2$ (X/default_mimBlockSize) (X is a certain positive integer, which is a multiple of 2) is encoded. In this event, one available maximal minimum subblock size may be selected as a value of X. Alternatively, when default_minBlockSize indicates the minimal minimum subblock size available for the current bitstream encoding or decoding, a value of $\log_2$ (default_mimBlockSize/X) (X is a certain positive integer, which is a multiple of 2) is encoded. In this event, an available minimal minimum subblock size may be selected as the value of X.

Magnifications of the horizontal size and the vertical size may be encoded, respectively.

Alternatively, the minimum subblock size value may be an index value of a prearranged table between the encoder and the decoder.

In this event, the minimum subblock size to be transmitted may be encoded using various binary coding methods such as a unary code, a truncated unary code, and an exponential (Exp) Golomb code.

Hereinafter, a fourth method of encoding the minimum subblock size will be described.

According to the fourth method, after the flag indicating whether to use the reference minimum subblock size and a minimum subblock size selected in a case where the reference minimum subblock size is not used are encoded in a first picture, a flag indicating whether to use a minimum subblock size of a previous picture and a minimum subblock size of a current picture in a case where the minimum subblock size of the previous picture is not used may be encoded from a second picture.

In a method of encoding default_minBlockSize, which is the information on the reference minimum subblock size, or minBlockSize, which is the information on the current minimum subblock size, the actual minimum subblock size can be designated and a value indicating the number of times, by which a subblock is to be enlarged or reduced from a predetermined size, may be transmitted. Alternatively, as described in the aforementioned first method, the minimum subblock size value may be represented using smaller bits through applying a log function to the minimum subblock size value instead of encoding directly the minimum subblock size value.

Ratios of the horizontal size and the vertical size may be separately encoded. Alternatively, the minimum subblock size value may be an index value of a prearranged table between the encoder and the decoder.

In this event, the minimum subblock size to be transmitted may be encoded using various binary coding methods such as a unary code, a truncated unary code, and an exponential (Exp) Golomb code.

An example of syntax according to the aforementioned fourth method of encoding the minimum subblock size is as follows.

```
First picture
use_default_ minBlockSize _flag
if(use_default_ minBlockSize _flag == 0)
{
minBlockSize
}
From second picture
use_prevPic_ minBlockSize _flag
if(use_prevPic_ minBlockSize e_flag == 0)
{
minBlockSize
}
```

Hereinafter, a fifth method of encoding the minimum subblock size will be described.

According to the fifth method, different minimum subblock sizes are used for the intra picture and the inter picture. That is, a minimum subblock size for the intra picture and a minimum subblock size of the inter picture are encoded in the sequence header. Alternatively, minimum subblock sizes according to picture types may be encoded only in a first intra picture header and a first inter picture header, respectively.

A method of encoding information on the minimum subblock size of the intra picture and the minimum subblock size of the inter picture may be used in combination with the aforementioned methods.

```
Sequence header
Set_intra minBlockSize _Flag
Set_inter minBlockSize _Flag
if(Set_intra minBlockSize _Flag == 1)
{
intra minBlockSize
}
if(Set_inter minBlockSize _Flag == 1)
{
inter minBlockSize
}
```

Hereinafter, various methods of decoding the minimum subblock size according to the present disclosure will be described.

A decoding method according to the first method of encoding the minimum subblock size is first described.

When a flag (Set_minBlockSize_flag) indicating whether to transmit information on the minimum subblock size is included, the flag (Set_minBlockSize_flag) indicating whether to transmit the information on the minimum subblock size is entropy decoded in an arranged position such as the sequence header, the header of each picture, or the slice header. When the decoded flag has a value indicating that the minimum subblock size is not transmitted, a minimum subblock having a predetermined size agreed with the encoder, for example, a 4×4 block is used as the minimum subblock.

When the decoded minimum subblock size designation flag (Set_minBlockSize_flag) indicates that the minimum subblock size is designated, the minimum subblock size is entropy decoded and extracted through a method agreed with the encoder among various entropy decoding methods such as a unary code, a truncated unary-code, an exponential (Exp)-Golomb code, etc.

When a horizontal size and a vertical size of the minimum subblock are separately set and transmitted, the horizontal size and the vertical size may be obtained by separately entropy decoding the horizontal size and the vertical size. Alternatively, when a square minimum subblock is used, only information on one side of the square minimum subblock may be entropy decoded.

A decoded value may be designated as the actual minimum subblock size and a value generated by enlarging or reducing the decoded value from a predetermined size agreed with the encoder may be designated as the minimum subblock size. Further, when a value generated by applying a log function to the minimum subblock size value is encoded in the encoder, a value generated by applying an exponential function to the entropy decoded value may be set as the minimum subblock size. For example, when the encoder encodes y, which is a value of $\log_2$ (minimum subblock size selected in the encoder/X) (X is a certain positive integer, which is a multiple of 2), the decoder can obtain the minimum subblock size selected in the encoder by entropy decoding y and multiplying X and $2^y$. Here, X is a value agreed between the encoder and the decoder or a value extracted from the bitstream before decoding the minimum subblock size. When a minimal minimum subblock size, which can be used as the X, is selected and used and an available minimal minimum subblock size is a size 4×4, the minimum subblock size is set as the size 4×4 if a value of decoded y is "0", and the minimum subblock size is set as a size 8×8 if the value of decoded y is "1". When the available minimum subblock size is the size 8×8, "8" instead of "4" is used as a value of X, and the minimum subblock size is set as the size 8×8 if the value of decoded y is "0".

When the encoder separately decodes ratios of the horizontal size and the vertical size, the minimum subblock size may be obtained by separately entropy decoding the ratios of the horizontal size and the vertical size.

An index value of a prearranged table between the encoder and the decoder is encoded, the minimum subblock size may be obtained by using a decoded value as the index value of the table.

In this event, the minimum subblock size to be transmitted may be decoded using various binary coding methods such as a unary code, a truncated unary code, and an exponential (Exp) Golomb code. Hereinafter, it is not described to separately decode and extract the horizontal size and the vertical size for the convenience of descriptions, but it is applicable to separately extract the horizontal size and the vertical size. Although it is exemplified to decode data on the sequence header and the picture header, the minimum subblock size may be decoded on the slice header or the minimum subblock header when the encoder encodes the minimum subblock size in the slice header or the minimum subblock header.

Hereinafter, a decoding method according to the second method of encoding the minimum subblock size will be described.

According to the second method, a size M×N agreed with the encoder is set as the reference minimum subblock size, and the flag indicating whether to use the reference minimum subblock size is entropy decoded from the minimum subblock header. When a value of the decoded flag indicates that the reference minimum subblock size is not used, information related to the minimum subblock is extracted by entropy decoding minimum subblock size information and the minimum subblock size is set. Since a case where the value of the decoded flag indicates that the reference minimum subblock size is used means that the minimum subblock size information is not included in the bitstream, a preset reference minimum subblock size is set as the minimum subblock size and a series of decoding processes are performed.

When the reference minimum subblock size is included in the sequence header and transmitted from the encoder to the decoder, the reference minimum subblock size may be extracted from an arranged position such as the sequence header within the bitstream. Here, the reference minimum subblock size or the current minimum subblock size may be allocated an entropy decoded value and the minimum subblock size may be obtained by scaling (enlarging or reducing) a predetermined size with the entropy decoded value. Alternatively, as described in the aforementioned first decoding method, when the encoder encodes a value generated by applying a log function to the minimum subblock size value, the minimum subblock size value may be obtained using an exponential function.

When ratios of the horizontal size and the vertical size are separately decoded in the encoder, the minimum subblock size may be obtained by separately entropy decoding the ratios of the horizontal size and the vertical size.

In addition, when an index value of a prearranged table between the encoder and the decoder is encoded, the minimum subblock size may be obtained by using the decoded value as the index value of the table.

In this event, the minimum subblock size to be transmitted may be decoded using various binary coding methods such as a unary code, a truncated unary code, and an exponential (Exp) Golomb code.

Hereinafter, a decoding method according to the third method of encoding the minimum subblock size will be described.

According to the third method, the video decoding apparatus extracts a flag indicating whether to use the reference minimum subblock size and/or additional information indicating an enlargement or a reduction by a predetermined ratio with respect to the reference minimum subblock size from the bitstream, and then can extract a current minimum subblock size by using the above information.

First, a size N×N is set as the reference minimum subblock size and a flag indicating whether to use the reference minimum subblock size is decoded in every header of each picture, slice header, and subblock header. When the flag indicates that the reference minimum subblock size is used, the current minimum subblock size is set to the same size as the reference macroblock size and a decoding is performed by using the set minimum subblock size in the unit of minimum subblocks. However, when the flag indicates that the reference minimum subblock size is not used, a value enlarged or reduced with respect to the reference minimum subblock size by a predetermined ratio agreed with the encoder is set as the current minimum subblock size and a decoding is performed in the unit of minimum subblocks. For example, a size enlarged or reduced twice from the horizontal size and the vertical size of the reference minimum subblock may be set as the current minimum subblock size.

When the encoder uses various enlarging or reducing ratios, includes a selected ratio in the bitstream, and encodes the bitstream, the decoder can obtain various ratios by decoding the flag corresponding to the number of bits agreed with the encoder from the bitstream in a flag entropy decoding.

Alternatively, when information indicating an enlarging ratio or a reducing ratio is included in the bitstream and encoded in addition to the flag indicating whether to use the reference minimum subblock size, the enlarging ratio or the reducing ratio may be either decoded or not according to a value of the flag indicating whether to use the reference minimum subblock size after the flag is decoded. If the enlarging ratio or the reducing ratio is not decoded, the reference minimum subblock size is set as the current minimum subblock size and then decoding processes are performed.

When the decoded flag indicates that the reference minimum subblock size is different from the current minimum subblock size and the decoded ratio is the enlarging ratio, the reference minimum subblock size is set as a minimal minimum subblock size available for the current bitstream encoding or decoding, and then a size enlarged from the reference minimum subblock size with the entropy decoded ratio is set as the current minimum subblock size. On the contrary, when the entropy decoded ratio is the reducing ratio, the reference minimum subblock size is set as a maximal minimum subblock size available for the current bitstream encoding or decoding, and then a size reduced with respect to the reference minimum subblock size with the entropy decoded ratio is set as the current minimum subblock size.

According to at least one embodiment of the present disclosure, when a flag indicating whether to set the reference minimum subblock size is included in the sequence header of the bitstream and transmitted, the decoder entropy decodes the flag from the sequence header. And then, when the flag indicates that the reference minimum subblock size is set, the decoder extracts reference minimum subblock size information from an arranged position such as the sequence header of the bitstream and sets the reference minimum subblock size by using the extracted information. When the flag indicates that the reference minimum subblock size is not set, a predetermined size arranged in advance between the encoder and the decoder, for example, a size 4×4 may be used as the reference minimum subblock size.

According to at least one embodiment of the present disclosure, the video decoding apparatus extracts information indicating the maximal minimum subblock size available for the current bitstream encoding or decoding from the bitstream and can use the extracted information in setting the reference minimum subblock size. According to at least one embodiment of the present disclosure, the video decoding apparatus extracts information indicating the minimal minimum subblock size available for the current bitstream encoding or decoding from the bitstream and can use the extracted information in setting the reference minimum subblock size. According to yet another embodiment of the present disclosure, the video decoding apparatus extracts information indicating information on both the maximal minimum subblock size and the minimal minimum subblock size available for the current bitstream encoding or decoding from the bitstream and can use the extracted information in setting the reference minimum subblock size.

In a method of decoding default_minBlockSize, which is the information indicating the reference minimum subblock size, an entropy decoded value itself can be set as a reference minimum subblock size value and the reference minimum subblock size can be obtained through an enlargement or a reduction from a predetermined size by using the entropy decoded value as an enlarging ratio or a reducing ratio. Alternatively, as described in the aforementioned first decoding method, when the encoder encodes a value generated by applying a log function to the minimum subblock size value, the minimum subblock size value may be obtained using an exponential function.

More specifically, for example, when default_minBlockSize indicates the maximal minimum subblock size available for the current bitstream encoding or decoding and the encoder encodes y, which is a value of $\log_2$ (X/default_minBlockSize) (X is a certain positive integer, which is a multiple of 2), the decoder can obtain default_minBlockSize by entropy decoding y and dividing X by $2^y$. In this event, X may be a value agreed between the encoder and the decoder like the available maximal minimum subblock size or a value extracted from the bitstream before decoding default_minBlockSize.

Alternatively, when default_minBlockSize indicates the minimal minimum subblock size available for the current bitstream encoding or decoding and the encoder encodes y, which is a value of $\log_2$ (default_minBlockSize/X) (X is a certain positive integer, which is a multiple of 2), the decoder and extracts the y from the bitstream through an entropy decoding. And then, the decoder sets a value generated by multiplying X and $2^y$ as default_minBlockSize. In this event, X may be a value agreed between the encoder and the decoder like the available minimal minimum subblock size or a value extracted from the bitstream before decoding default_minBlockSize.

Further, when ratios of the horizontal size and the vertical size are separately decoded in the encoder, the reference minimum subblock size may be obtained by separately entropy decoding the ratios of the horizontal size and the vertical size.

When an index value of a prearranged table between the encoder and the decoder is encoded, the minimum subblock size may be obtained by using the decoded value as the index value of the table.

In this event, the reference minimum subblock size may be decoded using various binary coding methods such as a unary code, a truncated unary code, and an exponential (Exp) Golomb code.

Hereinafter, a decoding method according to the fourth method of encoding the minimum subblock size will be described.

According to the fourth method, after a flag indicating whether to use the reference minimum subblock size and minimum subblock size information in a case where the reference minimum subblock size is not used are entropy decoded in a first picture, a minimum subblock size required for a first picture decoding is obtained using the decoded minimum subblock size information.

When the flag indicating whether to use the reference minimum subblock size means that the reference minimum subblock size is used, the minimum subblock size is set to the same size as the reference minimum subblock size and then the first picture is decoded.

From a second picture, after a flag indicating whether to use a minimum subblock size of a previous picture as the current minimum subblock size is decoded, minimum subblock size information for decoding the current picture is decoded when the minimum subblock size of the previous picture is not used. When the minimum subblock size of the previous picture is used for decoding the current picture, a minimum subblock size is set to the same size as the minimum subblock size of the previous picture and the second picture is decoded.

In a method of decoding default_minBlockSize, which is the information indicating the reference minimum subblock size, or minBlockSize, which is the information indicating the minimum subblock size of the current picture, an entropy decoded value can be used as the minimum subblock size and the minimum subblock size can be obtained through an enlargement or a reduction from a predetermined size by using the entropy decoded value as an enlarging ratio or a reducing ratio. Alternatively, as described in the aforementioned first decoding method, when the encoder encodes a value generated by applying a log function to the minimum subblock size value, the minimum subblock size value may be obtained using an exponential function.

Further, when ratios of the horizontal size and the vertical size are separately decoded in the encoder, the reference minimum subblock size may be obtained by separately entropy decoding the ratios of the horizontal size and the vertical size.

In addition, when an index value of a prearranged table between the encoder and the decoder is encoded, the minimum subblock size may be obtained by using the decoded value as the index value of the table.

In this event, the reference minimum subblock size may be decoded using various binary coding methods such as a unary code, a truncated unary code, and an exponential (Exp) Golomb code.

Hereinafter, a decoding method according to the fifth method of encoding the minimum subblock size will be described.

According to the fifth method, minimum subblock sizes of the intra picture and the inter picture are extracted from positions, which are agreed between the encoder and the decoder, within the bitstream, respectively, and a minimum subblock size according to the picture type is set.

Flags indicating whether to decode a minimum subblock size for the intra picture and indicating whether to decode a minimum subblock size for the inter picture are reconstructed in the sequence header or the picture header, respectively, and then the minimum subblock size for the intra picture or the inter picture is decoded according to a value of the flag through the bitstream or the image is reconstructed using an arranged minimum subblock size.

A method of decoding information on the minimum subblock size of the intra picture and the minimum subblock size of the inter picture may be used in combination with the aforementioned decoding methods according to the aforementioned encoding methods.

Hereinafter, various methods of selecting a combination of available subblock modes within the macroblock and encoding a subblock mode selected for encoding the current macroblock among the selected combination of the subblock modes will be described.

One macroblock is divided into a plurality of subblocks for the prediction or the transform. The macroblock size and the minimum subblock size within the macroblock according to the present disclosure may correspond to variable sizes, and information for the macroblock size and the minimum subblock size may be encoded using the aforementioned various methods.

A first method of encoding a combination of available subblock modes and a current block mode used in the prediction is first described.

A flag indicating whether to transmit information on available subblock modes for the prediction or the transform may be included in the sequence header or the header of each picture. A combination of available block modes may be either transmitted or not according to a value of the flag. If the combination of available block modes is not transmitted, a basic subblock combination agreed between the encoder and the decoder, for example, all subblock modes shown in Tables 1 to 5, are used in the prediction or the transform.

If the combination of available subblock modes is designated, information on the combination of block modes available for a current sequence encoding, a current picture encoding, a current slice encoding, or a current macroblock encoding among various block modes is transmitted. Information on the combination of available subblock modes to be encoded may be represented through a flag having a 1 bit length. For example, "1" is encoded when a subblock mode selected from subblocks of sizes 64×64, 64×32, 32×64, 32×32, 32×16, 16×32, 16×16, 16×8, 8×16, 8×8, 8×4, 4×8, and 4×4 (this order may be changed) is an available subblock mode, and "0" is encoded when a subblock mode is not an available subblock mode. For example, when an encoding is performed using a macroblock size, which corresponds to a pixel block of size 64×64, "0, 0, 0, 0, 0, 0, 1, 0, 0, 1, 0, 0, 1" is encoded in the sequence header, the picture header, or the slice header as a flag value based on an assumption that only a square subblock mode having a size smaller than a size 16×16 can be used for the prediction in the intra prediction mode.

Alternatively, information on the combination of available subblock modes to be encoded may be an index value of the table.

In this event, the information on the combination of subblock modes available in the prediction or the transform may be encoded using various binary coding methods such as a unary code, a truncated unary code, and an exponential (Exp) Golomb code.

Further, the combination of available subblock modes may be differently set according to the intra mode or the inter mode, and subblock mode combination information for the intra mode and subblock mode combination information for the inter mode may be encoded.

Block modes, which cannot be used in encoding a prediction mode selected for a current block encoding or transform type information, are deleted from the table and indexes are reallocated only to available block modes. And then, the reallocated indexes of the table are encoded. For example, subblock sizes available for a macroblock P of size 64×64 in the inter prediction mode are 16×16, 16×8, and 4×4. In a case where subblock modes are encoded using Tables 2 and 4, Table 2 may be revised to Table 6 through combination of Table 2 and Table 4. In this event, the number of bits required for an M×N_Block_type encoding is different according to the number of bits required for an M×N_Block_type encoding depends on the number of occurable types thereof.

If the combination of available subblock modes is designated, a flag indicating available types of block shapes are transmitted to the sequence header or the header of each picture. For example, in a case of a macroblock of size 64×64, use_M×Mblock_flag refers to a flag indicating whether to use square blocks of sizes 64×64, 32×32, 16×16, 8×8, and 4×4 in the prediction or the transform, use_M× (M/2)block_flag refers to a flag indicating whether to use vertically-long rectangular blocks of sizes 64×32, 32×16, 16×8, and 8×4 in the prediction or the transform, and use_(M/2)×Mblock_flag refers to a flag indicating whether to use horizontally-long rectangular blocks of sizes 32×64, 16×32, 8×16, and 4×8 in the prediction or the transform. When the flags indicate that block shapes used in a corresponding type are available for the prediction or the transform, blocks of various sizes included in the corresponding block shape are all available.

Alternatively, when the combination of available subblock modes is selected and used, a flag indicating that the subblock modes are selected and used is encoded into the bitstream, a flag indicating types of block shapes to be used is encoded and transmitted to the decoder, and a flag indicating that respective subblocks included in corresponding types are available for each size. For example, when the combination of available subblock modes is selected and used and subblock modes available for the prediction and the transform are 64×64, 16×16, and 8×8, "1" is encoded as a value of use_M×Nblock_flag and "0" is encoded as values of use_M×(M/2)block_flag and use_(M/2)×Mblockflag, so that the decoder is informed that square subblocks can be

TABLE 6

| M × N Bock_type | Name | Number of subblocks within M × N block | Prediction mode of first subblock within M × N block | Prediction mode of second subblock within M × N block | Horizontal size of subblock | Vertical size of subblock |
|---|---|---|---|---|---|---|
| 0 | P_L0_16 × 16 | 1 | L0 prediction | na | 16 | 16 |
| 1 | P_L0_16 × 8 | 2 | L0 prediction | L0 prediction | 16 | 8 |
| 2 | P_4 × 4 | 16 | na | na | 4 | 4 |
| 3 | P_4 × 4ref0 | 16 | na | na | 4 | 4 |
| inferred | P-Skip | 1 | L0 prediction | L0 prediction | 16 | 16 |

Hereinafter, it is not described to separately set the combination of available subblock modes for the prediction or the transform according to the prediction mode (intra prediction or inter prediction) for the convenience of descriptions, but it is applicable to separately set the combination of available subblock modes according to the prediction mode. Further, although it is exemplified that data is encoded on the sequence header and the picture header, the data can be encoded on the slice header or the macroblock header.

Hereinafter, a second method of encoding the combination of available subblock modes and the current block mode used for the prediction is described.

According to the second method, a flag indicating whether to transmit information on subblock modes available for the prediction or the transform may be included in the sequence header or the header of each picture. Information on the combination of available block modes may be either transmitted or not according to a value of the flag. If the information is not transmitted, all subblock modes within a basic subblock combination agreed between the encoder and the decoder are used for the prediction or the transform.

used for the prediction or the transform. Further, a flag indicating whether subblocks of sizes 64×64, 32×32, 16×16, 8×8, and 4×4 included in the combination of square subblock modes can be used for the prediction or the transform is encoded.

Alternatively, information on the combination of available subblock modes to be encoded may be an index value of a table.

In this event, the information on the combination of subblock modes available in the prediction or the transform may be encoded using various binary coding methods such as a unary code, a truncated unary code, and an exponential (Exp) Golomb code.

Block modes, which cannot be used in encoding a prediction mode selected for a current block encoding or transform type information, are deleted from the table and indexes are reallocated only to available block modes. And then, the reallocated indexes of the table are encoded.

Hereinafter, a third method of encoding the combination of available subblock modes and the current block mode used in the prediction is described.

According to the third method, a flag indicating whether to transmit information on subblock modes available for the prediction or the transform may be included in the sequence header or the header of each picture. Information on a combination of available block modes may be either transmitted or not. If the combination of the available block modes is not transmitted, all subblock modes within a basic subblock combination agreed between the encoder and the decoder are used for the prediction or the transform.

If the combination of available subblock modes is designated, a flag indicating whether subblock shapes included in a corresponding group are available is transmitted to the sequence header or the header of each picture, the group being determined for each subblock size, and a flag is encoded for each subblock shape in available subblock groups. For example, in a case of macroblocks of size 32×32, use_larger_(M/2)×(N/2)blk_flag refers to a flag indicating whether use block shapes of 32×32, 32×16, 16×32, and 16×16, use_larger_(M/4)×(N/4)blk_flag refers to a flag indicating whether to use blocks of 16×16, 16×8, 8×16, and 8×8, and use_larger_(M/8)×(N/8)blk_flag refers to a flag indicating whether to use block modes of 8×8, 8×4, 4×8, and 4×4.

A case where the flag indicates that the combination of subblock modes is available in the prediction or the transform means that all subblocks included in a group are available.

Alternatively, when the flag indicates that the combination of subblock modes is available in the prediction or the transform, a flag indicating whether respective various subblocks included in a group are available may be additionally decoded.

Alternatively, information on the combination of available subblock modes to be encoded may be an index value of the table.

In this event, the information on the combination of subblock modes available in the prediction or the transform may be encoded using various binary coding methods such as a unary code, a truncated unary code, and an exponential (Exp) Golomb code.

Block modes, which cannot be used in encoding a prediction mode selected for current block encoding or transform type information, are deleted from the table and indexes are reallocated only to available block modes. And then, the reallocated indexes of the table are encoded.

Hereinafter, various methods of decoding a combination of available subblock modes and a current block mode used in the prediction according to the present disclosure will be described.

A decoding method according to the first method of encoding the combination of available subblock modes and the current block mode used in the prediction is first described.

A flag indicating whether to select and use a combination of subblocks for the prediction or the transform is decoded in the sequence header or the header of each picture. When the decoded flag value indicates that the combination of subblocks is not selected and used, a basic subblock combination agreed between the encoder and the decoder, for example all subblock modes shown in Tables 1 to 5, are used in the prediction or the transform. When the decoded flag value indicates that the combination of subblocks is selected and used, 1 bit is additionally entropy decoded for each subblock mode and determined whether to be used.

Further, when an index value of the prearranged table between the encoder and the decoder is encoded in encoding information on the combination of available subblock modes, the index value of the table is decoded and then it may be set whether respective subblock modes are available with the arranged table.

In this event, the information on the combination of subblock modes available in the prediction or the transform may be extracted using various binary coding methods such as a unary code, a truncated unary code, and an exponential (Exp) Golomb code.

In addition, when it is arranged that the combination of available subblock modes is differently set depending on the intra mode or the inter mode, subblock mode combination information for the intra mode and subblock mode combination information for the inter mode are decoded.

After information on subblock modes available in the prediction or the transform is extracted, a table required for decoding the prediction mode or transform type information is made using the extracted information. In this event, block modes, which cannot be used, are deleted from a basic table, and only block modes, which can be used, are reallocated indexes. The number of bits for entropy decoding the prediction mode or transform information is determined according to the number of available subblock modes, and the entropy decoding corresponding to the determined number of bits is performed. As a result, the prediction mode or the transform information is extracted from the bitstream. In this event, a modified Table is used.

Hereinafter, a method of extracting information on the combination of available subblock modes for the prediction or the transform according to the prediction mode (intra prediction or inter prediction) from the bitstream and decoding the extracted information according to set information is not described for the convenience of descriptions, but a separate setting according to the prediction mode may be applied. Further, although it is exemplified that data is decoded on the sequence header and the picture header, the data may be decoded on the slice header or the macroblock header.

Hereinafter, a decoding method according to the second method of encoding the combination of available subblock modes and the current block mode used in the prediction is described.

According to the second method, a flag indicating whether to select and use the combination of subblocks for the prediction or the transform is decoded in the sequence header or the header of each picture. When the decoded flag value indicates that the combination of subblocks is not selected and used, all subblock modes included in a basic subblock combination agreed between the encoder and the decoder are used in the prediction or the transform.

When the decoded flag value indicates that the combination of subblocks is selected and used, a flag indicating available types of block shapes is extracted from the sequence header or the header of each picture. For example, use_M×Mblock_fla, use_M×(M/2)block_flag, and use_(M/2)×Mblock_flag are entropy decoded by 1 bit. When the decoded value indicates the availability for the prediction or the transform, it is set such that all blocks of various sizes included in a corresponding block shape can be used.

Alternatively, flags indicating available types of block shapes are extracted from the sequence header or the header of each picture. When the extracted flag value indicates the availability for the prediction or the transform, a flag indicating that respective subblocks included in a corresponding type can be used for each size is additionally entropy decoded and an available block mode combination may be determined.

Further, when an index value of the prearranged table between the encoder and the decoder is encoded in encoding information on the combination of available subblock modes, the index value of the table is decoded and then it may be set whether respective subblock modes are available with the arranged table.

In this event, the information on the combination of subblock modes available in the prediction or the transform may be extracted using various binary coding methods such as a unary code, a truncated unary code, and an exponential (Exp) Golomb code.

After information on subblock modes available in the prediction or the transform is extracted, a Table required for decoding the prediction mode or transform type information is made using the extracted information. In this event, block modes, which cannot be used, are deleted from a basic table, and only block modes, which can be used, are reallocated indexes. The number of bits for entropy decoding the prediction mode or transform information is determined according to the number of available subblock modes, and the entropy decoding corresponding to the determined number of bits is performed. As a result, the prediction mode or the transform information is extracted from the bitstream. In this event, a modified Table is used.

Hereinafter, a decoding method according to the third method of encoding the combination of available subblock modes and the current block mode used in the prediction is described.

According to the third method, a flag indicating whether to select and use the combination of subblocks for the prediction or the transform is decoded in the sequence header or the header of each picture. When the decoded flag value indicates that the combination of subblocks is not selected and used, all subblock modes included in a basic subblock combination agreed between the encoder and the decoder are used in the prediction or the transform.

When the decoded flag value indicates that the combination of subblocks is selected and used, flags indicating whether the subblocks can be used for each size and each group are extracted from the sequence header or the header of each picture. For example, in a case of macroblocks of size 32×32, use_larger_(M/2)×(N/2)blk_flag, use_larger_(M/4)×(N/4) blk_flag, and use_larger_(M/8)×(N/8) blk_flag are entropy decoded by 1 bit for the decoding, respectively. When the decoded value indicates the availability for the prediction or the transform, it is set such that all blocks of various shapes included in a corresponding size group can be used.

Alternatively, flags indicating a size group in which available subblocks are included are extracted from the sequence header or the header of each picture. When the extracted flag value indicates the availability for the prediction or the transform, a flag indicating that various subblock shapes included in a corresponding group can be used is additionally entropy decoded and an available block mode combination may be determined.

Further, when an index value of the prearranged table between the encoder and the decoder is encoded in encoding information on the combination of available subblock modes, it may be set whether respective subblock modes can be used using the arranged table after the index value of the table is decoded.

Further, when an index value of the prearranged table between the encoder and the decoder is encoded in encoding information on the combination of available subblock modes, it may be set whether respective subblock modes can be used based on the arranged table after the index value of the table is decoded.

In this event, the information on the combination of subblock modes available in the prediction or the transform may be extracted using various binary coding methods such as a unary code, a truncated unary code, and an exponential (Exp) Golomb code.

After information on subblock modes available in the prediction or the transform is extracted, a Table required for decoding the prediction mode or transform type information is made using the extracted information. In this event, block modes, which cannot be used, are deleted from a basic table, and only block modes, which can be used, are reallocated indexes. The number of bits for entropy decoding the prediction mode or transform information is determined according to the number of available subblock modes, and the entropy decoding corresponding to the determined number of bits is performed.

A candidate block type configuration unit may configure candidates of a block type input by a user or determine and configure the candidates of the block type for itself. In this event, when the block type corresponds to the macroblock size or the minimum subblock size, the candidates of the block type may be determined and configured according to a ratio of the horizontal size and the vertical size of the input image. When the block type corresponds to the subblock mode combination, the candidates of the block type may be differently configured according to the macroblock size, the intra prediction, or the inter prediction.

A block type determiner can include information for the determined block type in the bitstream once or in every picture of the input image. Therefore, according to the video decoding method according to at least one embodiment of the present disclosure, a video encoding apparatus according to at least one embodiment of the present disclosure configures block type candidates for encoding an image by using macroblocks of size 16×16 or more, encodes the input image for each block type candidate, determines a block type based on encoding costs for each block type candidate, and generates a bitstream including image data encoded in the determined block type and information for the determined block type.

The block type may be one of a macroblock size, a minimum subblock size, and a subblock mode combination, and is encoded using the encoding methods according to aforementioned embodiments. The video encoding apparatus according to at least one embodiment of the present disclosure may configure input block type candidates or determine and configure block type candidates according to characteristics of the input image in configuring block type candidates. When the block type corresponds to the macroblock size or the minimum subblock size, the block type candidates are determined and configured according to a ratio of a horizontal size and a vertical size of the input image. When the block type corresponds to the subblock mode combination, the block type candidates are differently configured according to the intra prediction or the inter prediction. Further, the video encoding method according to at least one embodiment of the present disclosure may include information for the determined block type in the bitstream once or in every picture of the input image in generating the bitstream.

A video decoding apparatus according to at least one embodiment of the present disclosure may include a video decoder for extracting information for a block type for encoding an image by macroblocks of size 16×16 or more and encoded image data from the bitstream, and generating a reconstructed image by decoding the encoded image data depending on a block type identified by the information for the block type.

The block type may be one of a macroblock size, a minimum subblock size, and a subblock mode combination. The video decoding apparatus according to at least one embodiment of the present disclosure can extract information for the block type from the bitstream once or in every picture of the input image or every slice.

Therefore, according to the video decoding method according to at least one embodiment of the present disclosure, a video decoding apparatus according to at least one embodiment of the present disclosure extracts information for a block type for encoding an image by using macroblocks of size 16×16 or more and encoded image data from the bitstream, and generates a reconstructed image by decoding the encoded image data depending on a block type identified by the information for the block type.

Hereinafter, implementation examples in which a video encoding apparatus according to at least one embodiment of the present disclosure is implemented according to a block type will be described through FIGS. 8 to 17.

Figure 8:
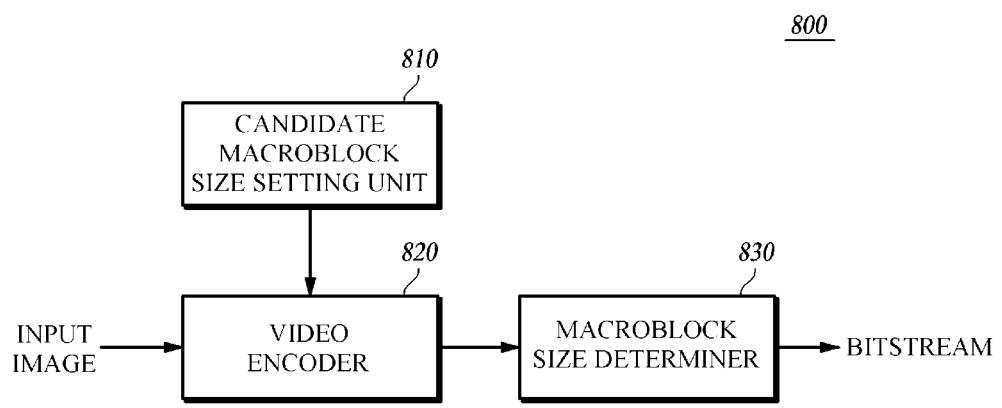
FIG. 8 is a block diagram of a first implementation of a video encoding apparatus according to at least one embodiment of the present disclosure.

FIG. 8 is a block diagram of a first implementation of a video encoding apparatus according to at least one embodiment of the present disclosure.

Based on the first implementation of the video encoding apparatus according to at least one embodiment of the present disclosure, the video encoding apparatus 800 may include a candidate macroblock size setting unit 810, a video encoder 820, and a macroblock size determiner 830.

The candidate macroblock size setting unit 810 sets macroblock size candidates, which can be used by the video encoding apparatus 800 according to at least one embodiment of the present disclosure. The macroblock size candidates are input by a user or determined according to image characteristics. Alternatively, the macroblock size candidates may be set candidates groups (e.g. size 64×64, size 32×32, and size 16×16) input by another apparatus.

In a case where the macroblock size candidates are determined according to image characteristics, if the image resolution is 4K×2K and a ratio of a width and a height is 16:9, the macroblock size candidates may include size 128×128, size 128×64, size 64×128, size 64×64, size 64×32, size 32×64, size 32×32, size 32×16, size 16×32, and size 16×16.

The video encoder 820 may be implemented as the video encoding apparatus 600 according to the embodiment of the present disclosure. That is, the video encoder 820 encodes an image for each macroblock size candidate set by the candidate macroblock size setting unit 810 and generates image data for each macroblock size. In this event, an intra encoding or an inter encoding is performed after each macroblock is internally divided into subblocks (here, a minimum subblock size, which is determined as the subblock, may be a block in the unit of 4×4 pixels), which are smaller blocks than the macroblock.

As another operation method of the video encoder 820, an encoding is performed using macroblocks of size 16×16 and size 32×32. As a result of the encoding, when encoding costs are higher in a case of using the macroblocks of size 32×32, the size 16×16 is determined as the macroblock size. When encoding costs are lower in the case of using the macroblocks of size 32×32, an encoding is performed again using macroblocks of size 64×64 and then encoding costs of using the macroblock of size 32×32 and size 64×64 are compared in the same way. Accordingly, the macroblock size may be determined.

As another operation method of the video encoder 820, an encoding is performed using macroblocks of size 16×16, size 32×16, size 16×32, and size 32×32. As a result of the encoding, a macroblock size having the best encoding efficiency is selected. And then, the encoding is performed using pixel blocks generated by enlarging a width, a height, and both the width and the height of the selected macroblock two times, respectively, as the macroblocks. If the encoding efficiency is not improved using an enlarged macroblock size, the encoding is stopped and the macroblock size is determined.

The macroblock size determiner 830 calculates encoding costs (i.e. encoding costs of image data for each macroblock size) generated when the video encoder 820 encodes the image for each macroblock size and compares encoding costs of respective macroblock sizes to determine an optimal macroblock size among macroblock size candidates. Here, the optimal macroblock size may be any macroblock size if the macroblock size generates the lowest encoding costs when the image is encoded using the corresponding macroblock size. However, in a case of using encoding costs, various optimal macroblock sizes may be determined using the encoding costs.

When the macroblock size is determined, the macroblock size determiner 830 generates image data encoded in the corresponding macroblock size as the bitstream. In this event, information on the determined macroblock size may be encoded using the methods of encoding the macroblock size according to the aforementioned embodiments and included in the bitstream. The information for the macroblock size may be included in the bitstream for an entire image only once or may be included in the bitstream in every picture of the entire image. Further, according to at least one embodiment of the present disclosure, the macroblock size in the encoding and/or decoding units may be differently selected for each picture, slice or macroblock layer.

Figure 9:
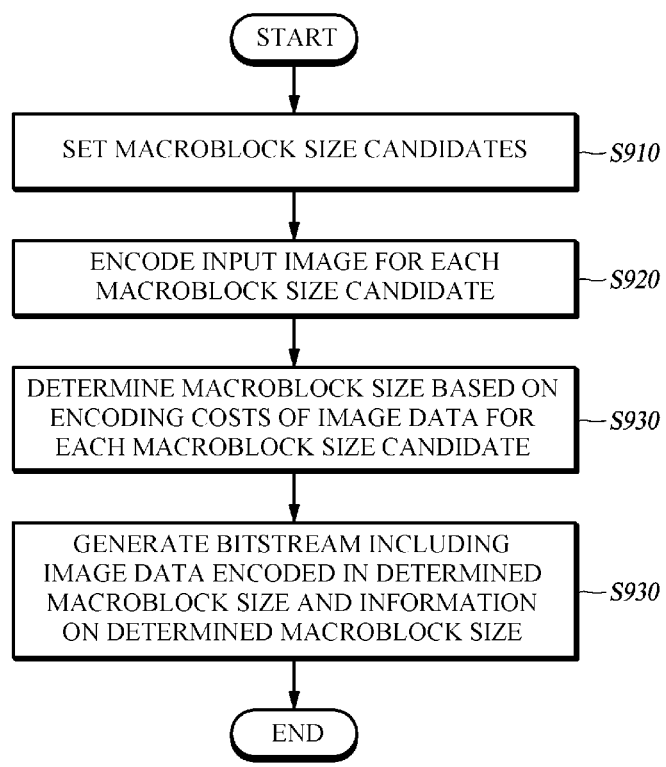
FIG. 9 is a flow chart of a first implementation of a video encoding method according to at least one embodiment of the present disclosure.

FIG. 9 is a flow chart of a first implementation of a video encoding method according to at least one embodiment of the present disclosure.

The video encoding apparatus 800 sets macroblock size candidates in step S910, encodes an input image for each macroblock size candidate in step S920, determines a macroblock size according to encoding costs of image data for each macroblock size candidate in step S930, and generates a bitstream including image data encoded in the determined macroblock size and information on the determined macroblock size in step S940. Since it has been described through FIG. 8 that the video encoding apparatus 800 sets macroblock size candidates, encodes the image for each macroblock size candidate, and determines a macroblock size according to encoding costs of image data encoded for each macroblock size candidate, its detailed description will be omitted.

Figure 24:
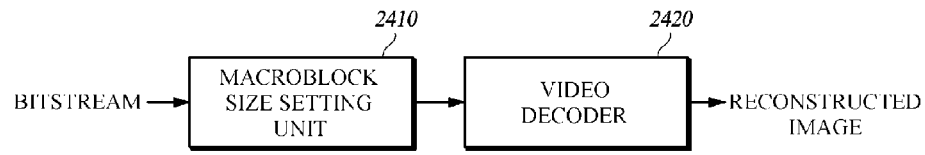
FIG. 24 is a block diagram of a first implementation of a video decoding apparatus according to at least one embodiment of the present disclosure.

FIG. 24 is a block diagram of a first implementation of a video decoding apparatus according to at least one embodiment of the present disclosure.

Based on the first implementation of the video decoding apparatus according to at least one embodiment of the present disclosure, the video decoding apparatus may include a macroblock size setting unit and a video decoder.

The macroblock size setting unit extracts macroblock size information from the bitstream by using the methods of decoding the macroblock size according to the aforementioned embodiments before performing the decoding in the unit of macroblocks, and sets a macroblock size by using the extracted information.

When it is arranged with the encoder that the macroblock size information is included in the bitstream for the entire image only once, the information is decoded only once in the bitstream for the entire image and an image may be reconstructed using a macroblock size extracted for an entire image decoding. When it is arranged that the macroblock size is encoded/decoded in every picture, a macroblock size is extracted for each picture from the bitstream and the image may be reconstructed using different macroblock sizes for each picture. According to at least one embodiment of the present disclosure, a macroblock size is extracted for each picture, slice, or macroblock layer and an image may be reconstructed using the selected macroblock size.

The video decoder may be implemented as the video decoder according to the embodiment of the present disclosure described through FIG. 7. Macroblock data may be decoded through methods according to embodiments of the present disclosure described with reference to FIGS. 20 to 23. As described in FIGS. 20 to 23, the method of decoding the macroblock data is different according to the macroblock size.

Figure 10:
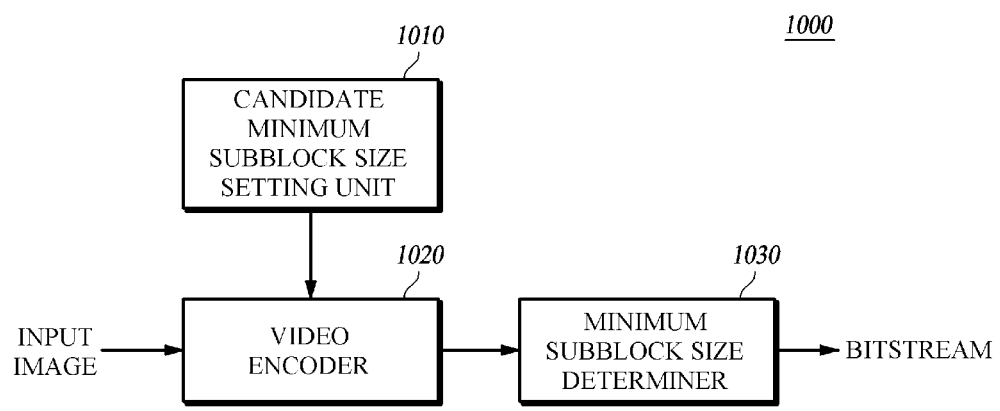
FIG. 10 is a block diagram of a second implementation of the video encoding apparatus according to at least one embodiment of the present disclosure.

FIG. 10 is a block diagram of a second implementation of the video encoding apparatus according to at least one embodiment of the present disclosure.

Based on the second implementation of the video encoding apparatus 1000 according to at least one embodiment of the present disclosure may include a candidate minimum subblock setting unit 1010, a video encoder 1020, and a minimum subblock size determiner 1030.

The candidate minimum subblock size setting unit 1010 sets minimum subblock size candidates, which can be used by the video encoding apparatus 800 according to at least one embodiment of the present disclosure. The minimum subblock size candidates may be input by a user or determined according to image characteristics. Alternatively, the minimum subblock size candidates may be a set candidate group (e.g. size 4×4, size 8×8, and size 16×16) input by another apparatus.

When the minimum subblock size candidates are determined according to the image characteristics, the minimum subblock size candidates can de determined in consideration of an image size and a ratio of a width and a height. For example, the minimum subblock size candidates may include size 4×4, size 4×8, size 8×4, size 8×8, size 16×8, size 8×16, and size 16×16.

Figure 11:
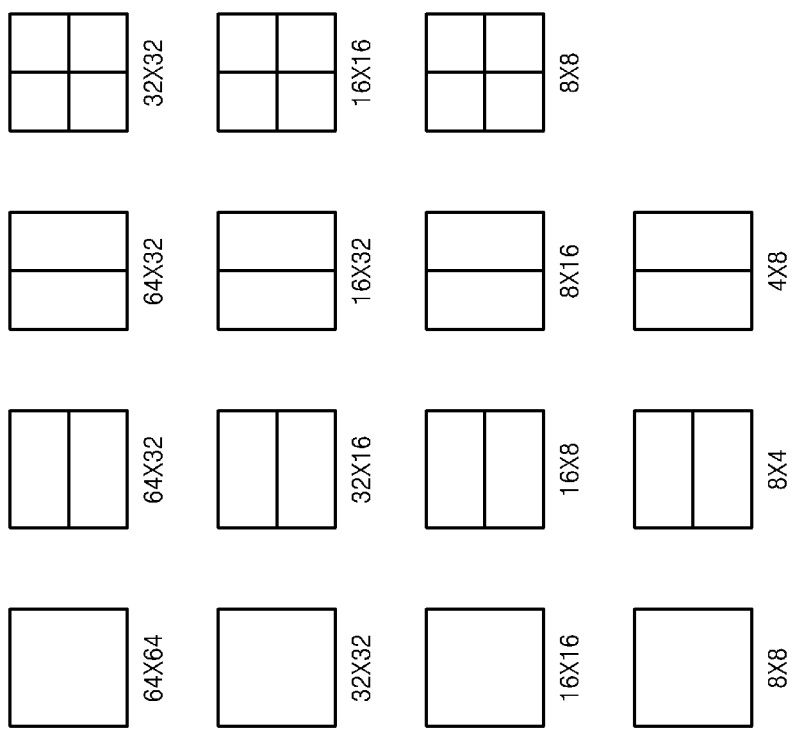
FIGS. 11 and 12 are exemplary diagrams of subblock modes of a macroblock depending on minimum subblock sizes.
Figure 12:
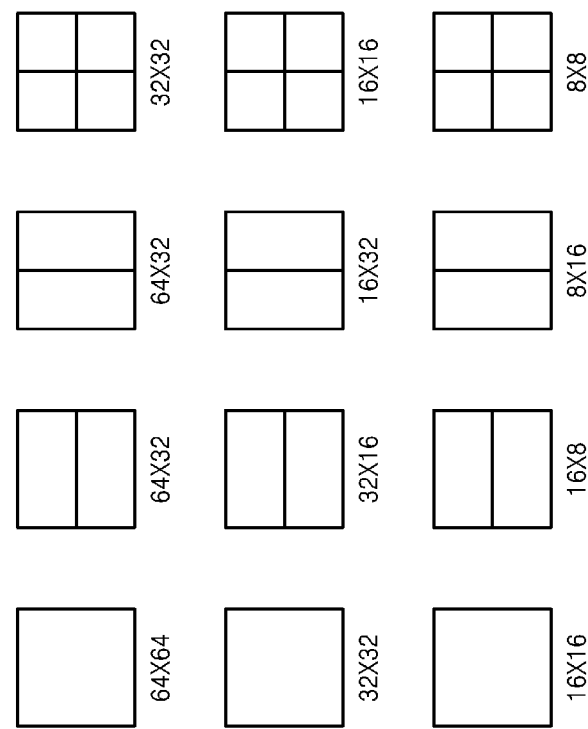

Referring to FIGS. 11 and 12 illustrating subblock modes of a macroblock according to a minimum subblock size, the macroblock is divided into smaller blocks as shown in FIGS. 11 and 12 and then an intra prediction encoding or an inter prediction encoding may be performed using the divided blocks. FIG. 11 shows subblock modes of a macroblock in a case where a macroblock size is 64×64 and a minimum subblock size is 4×8, and FIG. 12 shows subblock modes of a macroblock in a case where a macroblock size is 64×64 and a minimum subblock size is 8×8.

The video encoder 1020 may be implemented as the video encoding apparatus 600 according to the embodiment of the present disclosure described through FIG. 6. That is, the video encoder 1020 generates image data encoded for each minimum subblock size by encoding an image by using only subblocks of sizes larger than a corresponding subblock size for each minimum subblock size candidate set by the candidate minimum subblock size setting unit 1010.

The minimum subblock size determiner 1030 calculates encoding costs (i.e. encoding costs of image data encoded for each minimum subblock size) generated when the video encoder 1020 encodes an image for each minimum subblock size and compares encoding costs of image data encoded for each minimum subblock size to determine an optimal minimum subblock size among minimum subblock size candidates. Here, the optimal minimum subblock size may be a minimum subblock size if the minimum subblock size generates the lowest encoding costs when the image is encoded using the corresponding minimum subblock size among the minimum subblock size candidates. However, in a case of using encoding costs, various optimal minimum subblock sizes may be determined using the encoding costs.

Further, when the minimum subblock size is determined, the minimum subblock size determiner 1030 generates image data encoded in the corresponding minimum subblock size as the bitstream. In this event, information on the determined minimum subblock size may be directly included in the bitstream or encoded and then included in the bitstream. The information on the minimum subblock size may be included in the bitstream only once or may be included in the bitstream in every picture of the entire image.

Figure 13:
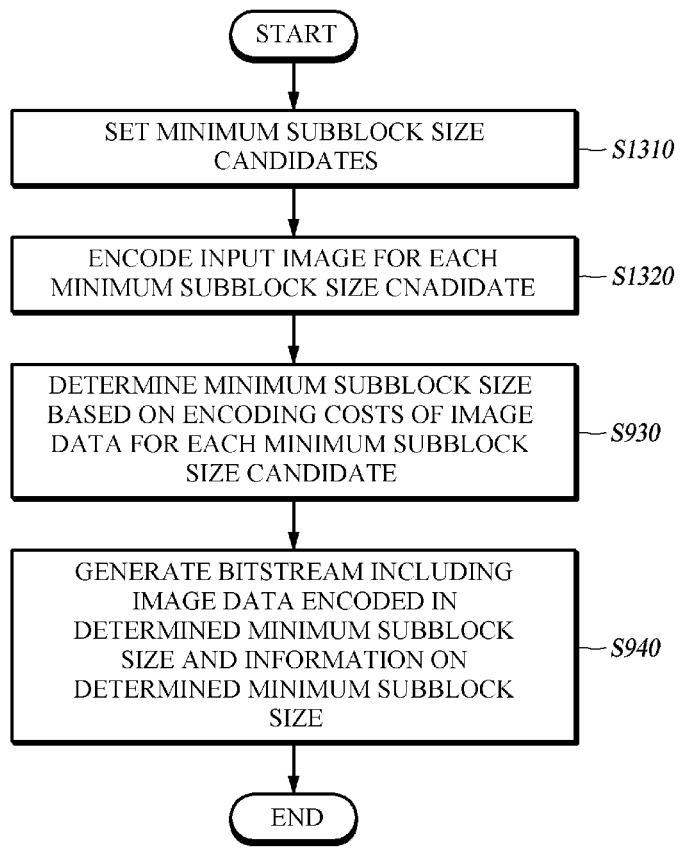
FIG. 13 is a flow chart of a second implementation of the video encoding method according to at least one embodiment of the present disclosure.

FIG. 13 is a flow chart of a second implementation of the video encoding method according to at least one embodiment of the present disclosure.

The video encoding apparatus 1000 sets minimum subblock size candidates in step S1310, encodes an input image for each minimum subblock size candidate in step S1320, determines a minimum subblock size according encoding costs of image data for each minimum subblock size candidate in step S1330, and generates a bitstream including image data encoded in the determined minimum subblock size and information on the determined minimum subblock size in step S1340. Since it has been described through FIG. 10 that the video encoding apparatus 1000 sets minimum subblock size candidates, encodes the image for each minimum subblock size candidate, and determines a minimum subblock size according to encoding costs of image data encoded for each minimum subblock size candidate, its detailed description will be omitted.

Figure 25:
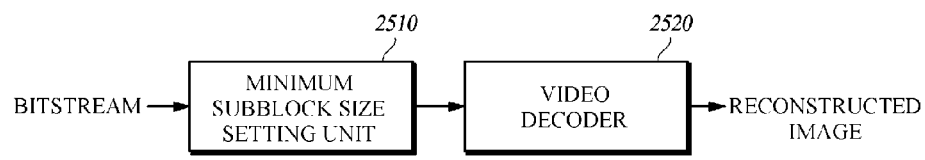
FIG. 25 is a block diagram of a second implementation of a video decoding apparatus according to at least one embodiment of the present disclosure.

FIG. 25 is a block diagram of a second implementation of a video decoding apparatus according to at least one embodiment of the present disclosure.

Based on the second implementation of the video decoding apparatus according to at least one embodiment of the present disclosure, the video decoding apparatus may include a minimum subblock size setting unit and a video decoder.

The minimum subblock size setting unit extracts minimum subblock size information from the bitstream by using the methods of decoding the minimum subblock size according to the aforementioned embodiments before performing the decoding in the unit of macroblocks, and sets a minimum subblock size by using the extracted information.

When it is arranged with the encoder that minimum subblock size information is included in the bitstream for the entire image only once, the information is decoded only once in the bitstream for the entire image and an image may be reconstructed using a minimum subblock size extracted for an entire image decoding. When it is arranged that the minimum subblock size is encoded/decoded in every picture, a minimum subblock size is extracted for each picture from the bitstream and the image may be reconstructed using different minimum subblock sizes for each picture. According to at least one embodiment of the present disclosure, a minimum subblock size is extracted for each picture, slice, or macroblock layer and an image may be reconstructed using a selected minimum subblock size.

The video decoder may be implemented as the video decoder according to the embodiment of the present disclosure described through FIG. 7. Macroblock data may be decoded through methods according to embodiments of the present disclosure described with reference to FIGS. 20 to 23. As described in FIGS. 20 to 23, the method of decoding the macroblock data is also different according to the minimum subblock size as described below.

For example, it is assumed that a macroblock size for a picture P is 32×32, each macroblock is divided into four 16×16 subblocks, and a macroblock type and a subblock type are encoded using Tables 2 and 4.

In a first case where a minimum block size is 4×4, an index value of "3" in Table 2 is encoded when the macroblock type is encoded, and then an index value of "0" in Table 2 is encoded when four subblock types are encoded for respective blocks of size 16×16 within a block of size 32×32. That is, encoded total data corresponds to 3, 0, 0, 0, 0.

In a second case where a minimum block size is 16×16, an index value of "3" in Table 2 is encoded when the macroblock type is encoded. That is, encoded total data corresponds to 3.

Similarly, referring to an operation in the decoder, a macroblock type is entropy decoded in a first case. Through applying a value of the decoded macroblock type to Table 2, it can be derived that a macroblock of size 32×32 is divided into four blocks of size 16×16, and a subblock type of the blocks of size 16×16 should be decoded because each block of size 16×16 can be divided into blocks having a smaller size (because a minimum subblock is 4×4). Next, since a value of the entropy decoded subblock type is "0", it can be derived that a 16×16 prediction is performed on a first block of size 16×16. Thereafter, since the first block of size 16×16 is not divided into blocks having a smaller size, subblock types of the remaining blocks of size 16×16 are equally decoded.

In a second case, the macroblock type is entropy decoded. Through applying a value of the decoded macroblock type to Table 2, it can be derived that a macroblock of size 32×32 is divided into four blocks of size 16×16, and a macroblock type decoding of the current macroblock and a subblock type decoding are terminated because each block of size 16×16 cannot be divided into blocks having a smaller size (because a minimum subblock size is 16×16).

Figure 14:
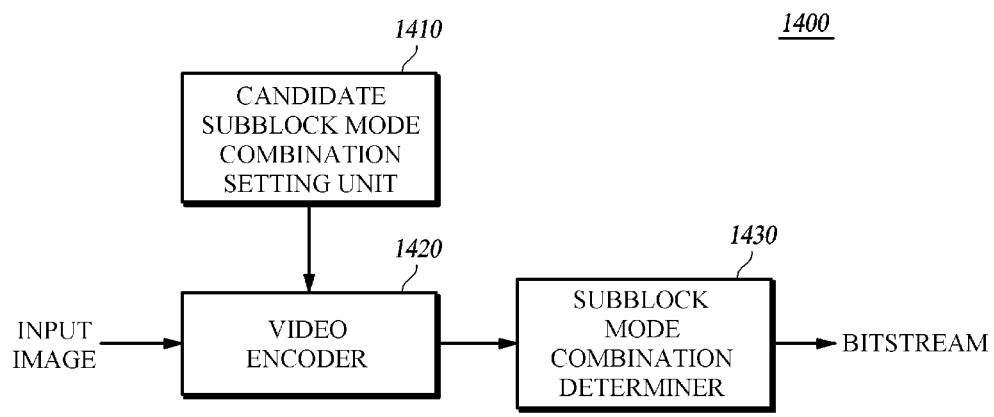
FIG. 14 is a block diagram of a third implementation of the video encoding apparatus according to at least one embodiment of the present disclosure.

FIG. 14 is a block diagram of a third implementation of the video encoding apparatus according to at least one embodiment of the present disclosure.

Based on the third implementation of the video encoding apparatus according to at least one embodiment of the present disclosure, the video encoding apparatus 1400 may include a candidate subblock mode combination setting unit 1410, a video encoder 1420, and a subblock mode combination determiner 1430.

The candidate subblock mode combination setting unit 1410 sets subblock mode combination candidates, which can be used by the video encoding apparatus 1400 according to at least one embodiment of the present disclosure. The subblock mode candidates may be input by a user or determined according to a prediction scheme such as an intra prediction or an inter prediction. Alternatively, the subblock mode candidates may be a set candidate group (e.g. a combination of sizes 4×4 and 8×8, a combination of sizes 16×16, 32×32, and 64×64, etc.) input by another apparatus.

Figure 15:
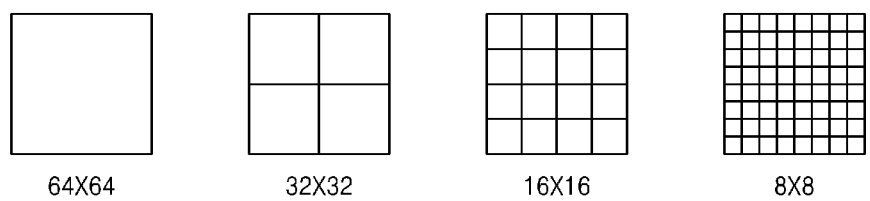
FIGS. 15 and 16 are exemplary diagrams of combinations of the subblock modes.
Figure 16:
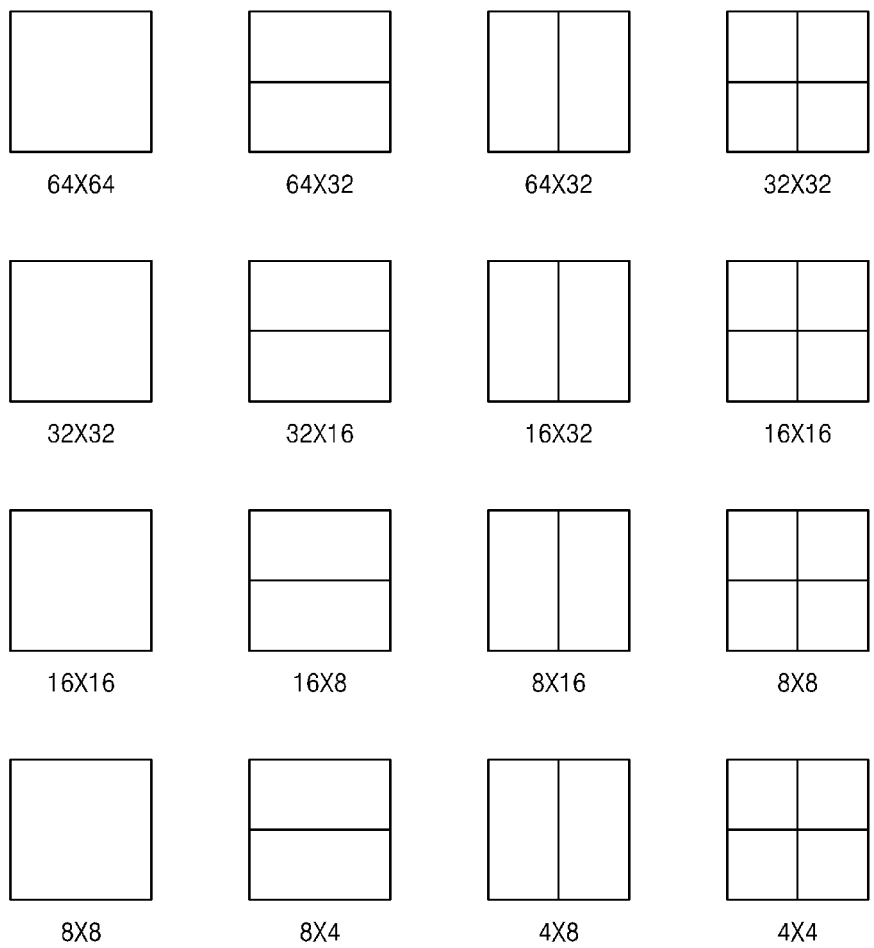

Referring to FIGS. 15 and 16 illustrating subblock mode combinations, subblock mode combinations for a macroblock of size 64×64 may be variously set or determined as shown in FIGS. 15 and 16. FIG. 15 shows a case where a combination of sizes 64×64, 32×32, 16×16, and 8×8 is set as a subblock mode combination for a macroblock of size 64×64, and FIG. 16 shows a case where a combination of sizes 64×64, 64×32, 32×64, 32×32, 32×16, 16×32, 16×16, 16×8, 8×16, 8×8, 8×4, 4×8, and 4×4 is set as a subblock mode combination for a macroblock of size 64×64.

The video encoder 1420 may be implemented as the video encoding apparatus 600 according to the embodiment of the present disclosure described through FIG. 6. That is, the video encoder 1420 generates image data encoded for each subblock mode combination by encoding an image by using only subblocks within a corresponding subblock mode combination for each subblock mode combination candidate set by the candidate subblock mode combination setting unit 1410.

The subblock mode combination determiner 1430 calculates encoding costs (i.e. encoding costs of image data encoded for each subblock mode combination) generated when the video encoder 1420 encodes an image for each subblock mode combination and compares encoding costs of image data encoded for each subblock mode combination to determine an optimal subblock mode combination among subblock mode combination candidates. Here, the optimal subblock mode combination may be a subblock mode combination if the subblock mode combination generates the lowest encoding costs when the image is encoded only using a subblock mode within the corresponding subblock mode combination among the subblock mode combination candidates. However, in a case of using encoding costs, the optimal subblock mode combination may be variously determined using the encoding costs.

When the subblock mode combination is determined, the subblock mode combination determiner 1430 generates image data encoded in the corresponding subblock mode combination as the bitstream. In this event, information on the determined subblock mode combination may be directly included in the bitstream or encoded and then included in the bitstream. The information on the subblock mode combination may be included in the bitstream only once or may be included in the bitstream in every picture of the entire image.

Figure 17:
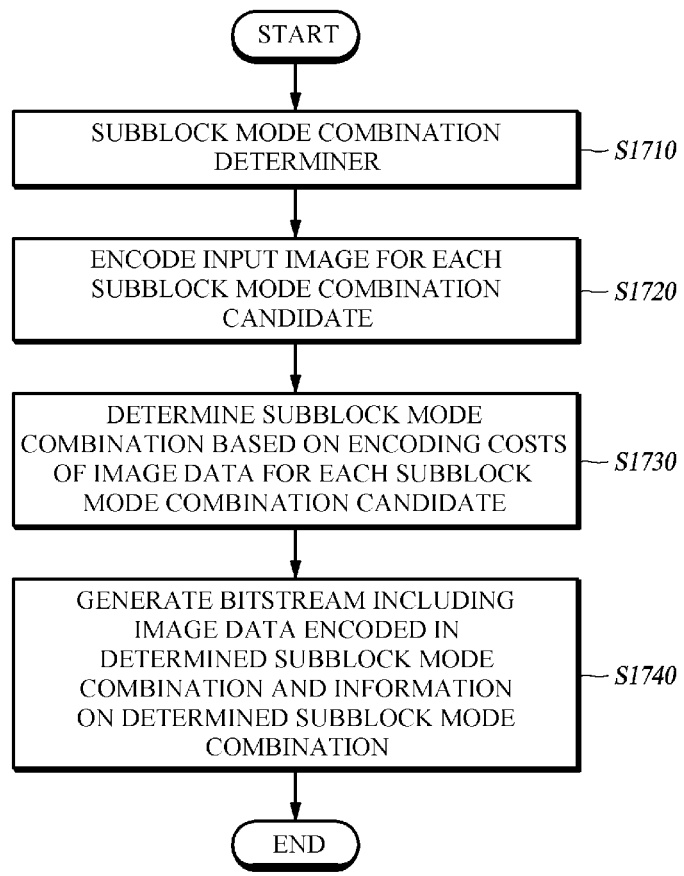
FIG. 17 is a flow chart of a third implementation of the video encoding method according to at least one embodiment of the present disclosure.

FIG. 17 is a flow chart of a third implementation of the video encoding method according to at least one embodiment of the present disclosure.

The video encoding apparatus 1400 sets subblock mode combination candidates in step S1710, encodes an input image for each subblock mode combination candidate in step S1720, determines a subblock mode combination according to encoding costs of image data for each subblock mode combination in step S1730, and generates a bitstream including image data encoded in the determined subblock mode combination and information on the determined subblock mode combination in step S1740. Since it has been described through FIG. 14 that the video encoding apparatus 1400 sets subblock mode combination candidates, encodes the image for each subblock mode combination candidate, and determines the subblock mode combination according to encoding costs of image data encoded for each subblock mode combination candidate, its detailed description will be omitted.

Figure 26:
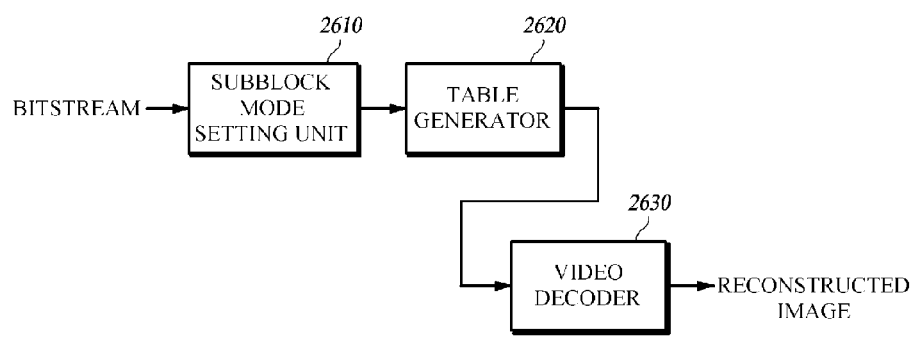
FIG. 26 is a block diagram of a third implementation of a video decoding apparatus according to at least one embodiment of the present disclosure.

FIG. 26 is a block diagram of a third implementation of the video decoding apparatus according to at least one embodiment of the present disclosure.

Based on the third implementation of the video decoding apparatus according to at least one embodiment of the present disclosure, the video decoding apparatus may include a subblock mode setting unit, a table generator, and a video decoder available in the prediction or the transform.

The subblock mode setting unit extracts available subblock mode combination information from the bitstream by using the methods of decoding the subblock mode information available in the prediction or the transform according to the aforementioned embodiments before performing the decoding in the unit of macroblocks, and sets whether respective various subblock modes are available with the extracted information.

When it is arranged with the encoder that subblock mode combination information is included in the bitstream for the entire image only once, the information is decoded only once in the bitstream for the entire image and an image may be reconstructed using a subblock mode combination extracted for an entire image decoding. When it is arranged that the subblock mode combination is encoded/decoded in every picture, subblock mode combination information is extracted for each picture from the bitstream and the image may be reconstructed using different subblock mode combinations for each picture. According to at least one embodiment of the present disclosure, the information is extracted for each picture, slice, or macroblock layer and the image may be reconstructed using only selected subblock modes.

The table generator updates a table required for decoding macroblock data by using subblock mode information, which is can be used in the prediction or the transform, extracted from the subblock mode setting unit. Block modes, which cannot be used, are deleted from a basic table prearranged with the encoder and only available block modes are reallocated indexes.

The video decoder may be implemented as the video decoder according to the embodiment of the present disclosure described through FIG. 7. However, a video decoding apparatus according to at least one embodiment of the present disclosure generates a reconstructed image by decoding image data encoded using only subblock modes, which can be used in the prediction or the transform, set in the subblock mode setting unit. Particularly, in extracting macroblock data from the reconstructor, prediction information is entropy decoded through the number of bits for entropy decoding a prediction mode or transform information differently set according to the number of available subblock modes and the prediction information is set by using the table updated in the table generator.

Hereinafter, a method of encoding and decoding subblocks within a macroblock by selectively using an intra prediction or an inter prediction will be described as another embodiment of the present disclosure.

According to typical video compression technology, a predictive encoding and a predictive decoding are performed on subblocks of one macroblock having a fixed size of an inter picture based on the same prediction method. That is, inter predictive encoding or an intra predictive encoding is performed on all subblocks within one macroblock. However, in another embodiment of the present disclosure, as an image is encoded using macroblocks of size 16×16 or more, sizes of subblocks within the macroblock are also enlarged, so that respective subblocks within the macroblock may be encoded or decoded selectively using the inter prediction or the intra prediction in a case where the macroblock is an inter macroblock within an inter picture. Alternatively, macroblock types of the inter picture are divided into three types such as an intra macroblock, an inter macroblock, and an intra/inter macroblock, and the encoding or decoding may be applied to only the intra/inter macroblock type. That is, respective subblocks within the intra macroblock are all intra prediction encoded, and respective subblocks within the inter macroblock are all inter prediction encoded. In a case of the intra/inter macroblock, respective subblocks within the macroblock may be encoded selectively using the inter prediction or the intra prediction. Only when respective subblocks within the macroblock are encoded selectively using the intra prediction or the inter prediction, information on whether an intra prediction mode or an inter prediction mode is used for each block is encoded.

The video encoding apparatus according to at least one embodiment of the present disclosure may be equally or similarly constructed to the video encoding apparatus according to the embodiment of the present disclosure described through FIG. 6. However, the video encoding apparatus according to at least one embodiment of the present disclosure compares encoding costs generated when only the intra prediction is used, encoding costs generated when only the inter prediction is used, and encoding costs generated when both the inter prediction and the intra prediction are used to determine a macroblock type, and prediction encodes respective subblocks according to a selected prediction scheme to generate a bitstream. Therefore, according to at least one embodiment of the present disclosure, all subblocks within one macroblock can be prediction encoded using the inter prediction, all subblocks can be prediction encoded using the intra prediction, and some subblocks can be inter prediction encoded and the remaining subblocks can be intra prediction encoded.

Further, the video encoding apparatus according to at least one embodiment of the present disclosure can directly include information on the inter prediction or the intra prediction, which indicates whether respective subblocks are encoded using the inter prediction or the intra prediction, in the bitstream or encode the information and then include the encoded information in the bitstream when the respective subblocks within the macroblock correspond to the macroblock type, which can selectively use the intra prediction or the inter prediction. Based on the video encoding apparatus according to at least one embodiment of the present disclosure, the video encoding apparatus compares encoding costs generated when only the intra prediction is used, encoding costs generated when only the inter prediction is used, and encoding costs generated when both the inter prediction and the intra prediction are used, to determine a macroblock type, and prediction encodes respective subblocks according to a selected prediction scheme to generate a bitstream.

A video decoding apparatus according to at least one embodiment of the present disclosure may be equally or similarly constructed to the video decoding apparatus according to the embodiment of the present disclosure. However, the video decoding apparatus according to at least one embodiment of the present disclosure decodes a macroblock type of a macroblock of size 16×16 or more from the bitstream and reconstructs the decoded macroblock type. When the reconstructed macroblock type corresponds to blocks, which can use only the intra prediction, information on an intra prediction mode of each block is extracted, decoded, and reconstructed. When the macroblock type corresponds to blocks, which can use only the inter prediction, motion information on each block is extracted, decoded, and reconstructed. When the macroblock type corresponds to blocks, which can selectively use the intra prediction mode and the inter prediction mode for each subblock, information on an inter prediction or an intra prediction selected for respective subblocks within the macroblock of size 16×16 or more is extracted, decoded, and reconstructed. Further, the macroblock is decoded and reconstructed by inter predicting or intra predicting respective subblocks by using the reconstructed information on the inter prediction or the intra prediction. Meanwhile, as described above, respective subblocks within the macroblock can be predicted selectively using the inter prediction or the intra prediction, but the predictive encoding can be performed using only one of the inter prediction and the intra prediction or selectively using the inter prediction or the intra prediction according to a macroblock size. That is, available macroblock types are different according to the macroblock size. For example, the predictive encoding can be performed on respective subblocks within a macroblock of size 32×32 by selectively using the inter prediction or the intra prediction, but a macroblock of size 16×16 selectively uses the intra prediction or the inter prediction in the unit of macroblocks.

Alternatively, the predictive encoding can be performed by using only one of the inter prediction and the intra prediction or selectively using the inter prediction or the intra prediction according to a block size. For example, the predictive encoding is performed on subblocks having a size larger than size 8×8 within an inter macroblock of an inter picture by using only one of the inter prediction and the intra prediction, and the predictive encoding may be performed on blocks of size 8×8 or less by selectively using the inter prediction or the intra prediction because it is preferable to use the inter mode in an area having no texture such as a background in a case where both the intra mode and the inter mode are all available, and, in this event, a block size is substantially large. Further, it is preferable to select one of the intra mode and the inter mode in a complex area because a subblock size is substantially small in the complex area. Accordingly, if the predictive encoding is performed selectively using the inter prediction or the intra prediction in the unit of macroblocks, the encoding efficiency may be deteriorated because there are various areas within a macroblock such as a macroblock of size 16×16 or more.

Figure 18:
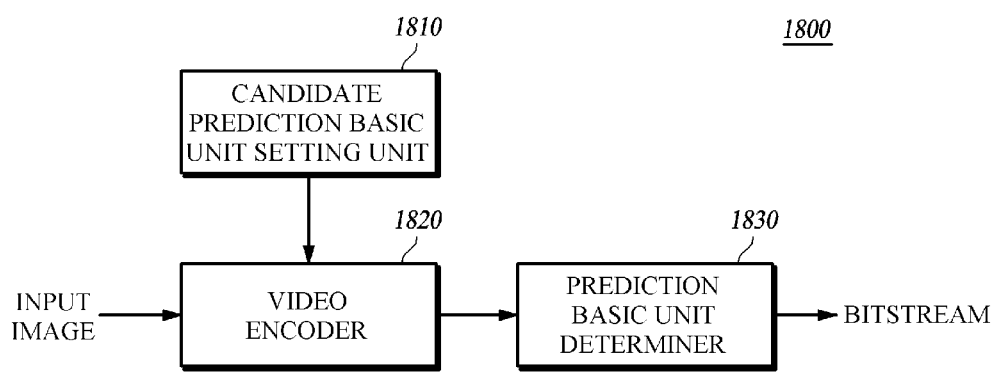
FIG. 18 is a flow chart of an example of a video encoding apparatus according to at least one embodiment of the present disclosure.

FIG. 18 is a flow chart of an example of a video encoding apparatus according to yet another embodiment of the present disclosure.

The video encoding apparatus 1800 according to yet another embodiment of the present disclosure may include a candidate prediction basic unit setting unit 1810, a video encoder 1820, and a prediction basic unit determiner 1830.

The candidate basic unit setting unit 1810 sets prediction basic unit candidates for macroblocks of size 16×16 or more. The prediction basic unit candidates may be input by a user or determined according to image characteristics. Alternatively, the prediction basic unit candidates may be a set candidate group (e.g. 16×16, 32×32, etc.) input by another apparatus. When the prediction basic unit candidates are determined according to the image characteristics, various candidate groups having size 16×16 or more may be determined in consideration of an image size, a ratio of a width and a height, etc.

Here, the prediction basic unit refers to a block size, which can select the inter prediction or the intra prediction within the macroblock. That is, the macroblock is the basic unit of an encoding and/or decoding processing, and the prediction basic unit is the unit, which can select a prediction scheme. For example, when a prediction basic unit of a macroblock of size 32×32 is a block of size 16×16, a block having a size larger than size 16×16 can use only the inter prediction and a block of 16×16 can select the intra prediction or the inter prediction. In this event, information on a selected prediction mode (information indicating whether the prediction mode is the intra prediction or the inter prediction) is encoded in the unit of blocks of size 16×16 when the macroblock is divided into blocks of size 16×16 or less. That is, subblocks of size 16×16 or less can use only the intra prediction or only the inter prediction according to the prediction mode information.

The video encoder 1820 may be implemented as the video encoding apparatus 600 according to the embodiment of the present disclosure described through FIG. 6. That is, the video encoder 1820 performs an encoding selectively using the inter prediction or the intra prediction as the corresponding prediction basic unit for each prediction basic unit candidate set by the candidate prediction basic unit setting unit 1810, to generate image data encoded for each prediction basic unit candidate.

The prediction basic unit determiner 1830 calculates encoding costs (i.e. encoding costs of image data encoded for each prediction basic unit candidate) generated when the video encoder 1820 encodes an image for each prediction basic unit candidate and compares encoding costs of image data encoded for each prediction basic unit candidate to determine an optimal prediction basic unit among prediction basic unit candidates. Here, the optimal prediction basic unit may be any prediction basic unit among the prediction basic unit candidates if the prediction basic unit generates the lowest encoding costs when the image is encoded using the corresponding prediction basic unit. However, in a case of using encoding costs, the optimal prediction basic unit may be variously determined using the encoding costs.

When the prediction basic unit is determined, the prediction basic unit determiner 1830 generates image data encoded in the corresponding prediction basic unit as the bitstream. In this event, information on the prediction basic unit may be directly included in the bitstream or encoded and then included in the bitstream. The information on the prediction basic unit may be included in the bitstream for an entire image only once or may be included in the bitstream in every picture of the entire image or every slice.

Hereinafter, another method of determining the prediction basic unit will be described (here, the prediction basic unit determiner is not used).

After the video encoder 1820 compares encoding costs generated when the intra prediction mode is used for respective blocks within the macroblock with encoding costs generated when the inter prediction mode is used for respective blocks within the macroblock, to determine an optimal prediction mode for each block, the video encoder 1820 sets a macroblock type to a value indicating an intra macroblock and encodes the macroblock type when all subblocks within the macroblock use the intra prediction mode and the video encoder 1820 sets a macroblock type to a value indicating an inter macroblock and encodes the macroblock type when all subblocks within the macroblock use only the inter prediction mode. When there are blocks within the macroblock, which use both the intra prediction mode and the inter prediction mode, the video encoder 1820 sets a macroblock type to a value indicating an intra/inter macroblock and encodes the macroblock type. And then, the video encoder 1820 sets a maximum size of a subblock selecting the intra prediction mode as the prediction basic unit and encodes information on the prediction basic unit and information on whether the intra prediction mode is selected or the inter prediction mode is selected as the prediction mode unit.

Hereinafter, a method of encoding the selected prediction basic unit will be described. The prediction basic unit may be either transmitted or not using a flag (Set_predBlock-Size_flag) indicating whether to transmit a prediction basic unit size to the sequence header or the header of each picture. When the prediction basic unit is not transmitted, size 16×16 is used as the prediction basic unit.

When the prediction basic unit is designated, information on the prediction basic unit is transmitted. In this event, a prediction basic unit having a certain size of which a horizontal size and a vertical size are separately set may be used. Further, a particular value may be designated as the prediction basic unit or a value indicating the number of times, by which a prediction basic unit is to be enlarged from a predetermined size, may be transmitted. That is, a value of $\log_2$ (selected prediction basic unit/16) is encoded. For example, "0" is encoded when a selected prediction basic unit is size 16×16, and "1" is encoded when the selected prediction basic unit is size 32×32. Hereinafter, it is not described that a horizontal size and a vertical size are separately set, but it is applicable to separately set the horizontal size and the vertical size. Further, although it is exemplified that data is encoded on the sequence header and the picture header, the data may be encoded on the slice header. Furthermore, a value indicating the number of times, by which a prediction basic unit is to be reduced from a predetermined size, may be transmitted.

```
Set_ predBlockSize _flag
if(Set_ predBlockSize _flag == 1)
{
predBlockSize
}
or
Set_ predBlockSize _flag
if(Set_ predBlockSize _flag == 1)
{
predBlockSize _Width
predBlockSize _height
}
```

In a second method, a selected basic prediction basic unit is encoded when size 16×16 is selected as the basic prediction basic unit, a flag indicating whether to use the basic prediction basic unit is encoded in every picture header, and the basic prediction basic unit is not used. Alternatively, when the basic prediction basic unit is not set after a flag indicating whether to set the basic prediction basic unit is encoded in the sequence header, size 16×16 is used as the basic prediction basic unit. When the basic prediction basic unit is set, the basic prediction basic unit may be encoded.

Sequence Header:

```
Set_default predBlockSize _Flag
if(Set_ default predBlockSize _Flag == 1)
{
default_ predBlockSize
}
Picture header:
use_default_ predBlockSize _flag
if(use_default_ predBlockSize e_flag == 0)
{
predBlockSize
}
```

In a third method, after a flag indicating whether to use the basic prediction basic unit and a prediction basic unit selected in a case where the basic prediction basic unit is not used are encoded in a first picture, a flag indicating whether to use a prediction basic unit of a previous picture and a prediction basic unit of a current picture in a case where the prediction basic unit of the previous picture is not used may be encoded from a second picture.

```
Picture header of first picture
use_default_ predBlockSize _flag
if(use_default_ predBlockSize _flag == 0)
{
predBlockSize
}
From second picture
use_prevPic_ predBlockSize _flag
if(use_prevPic_ predBlockSize e_flag == 0)
{
predBlockSize
}
```

Figure 19:
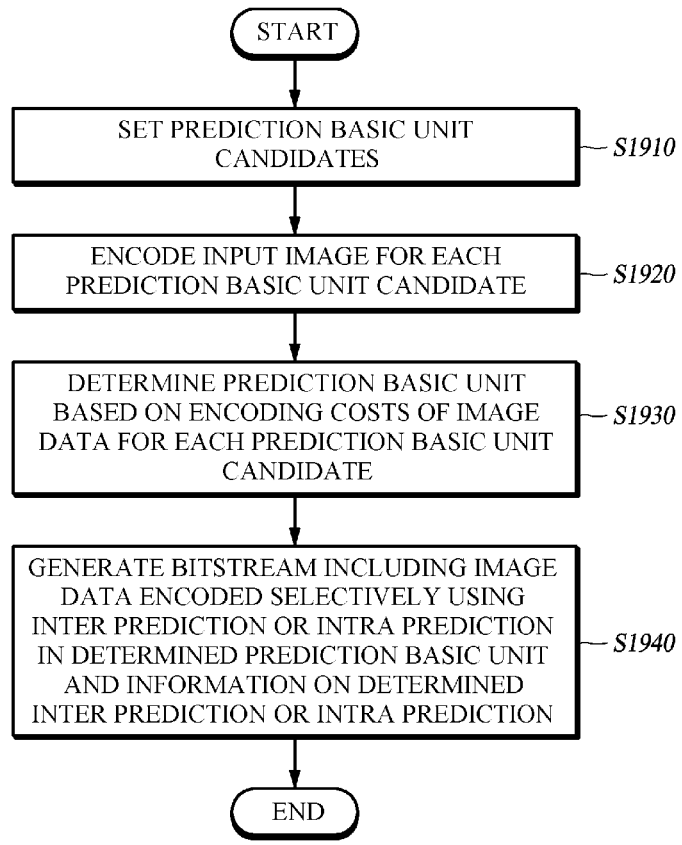
FIG. 19 is a flow chart of an example of a video encoding method according to at least one embodiment of the present disclosure.

FIG. 19 is a flow chart of an example of a video encoding method according to yet another embodiment of the present disclosure.

The video encoding apparatus 1800 sets prediction basic unit candidates in step S1910, encodes an input image for each prediction basic unit candidate in step S1920, determines a prediction basic unit based on encoding costs of image data for each prediction basic unit candidate in step S1930, and generates a bitstream including image data encoded selectively using an inter prediction or an intra prediction for each subblock of a macroblock and information on the determined prediction basic unit in step S1940. Since it has been described through FIG. 10 that the video encoding apparatus 1900 sets prediction basic unit candidates, encodes the image for each prediction basic unit candidate, and determines the prediction basic unit based on encoding costs for each prediction basic unit candidate, its detailed description will be omitted.

A video decoding apparatus according to yet another embodiment of the present disclosure may be equally or similarly constructed to the video decoding apparatus 700 according to the embodiment of the present disclosure described through FIG. 7. However, the video decoding apparatus according to yet another embodiment of the present disclosure extracts not only image data but also information on the prediction basic unit for selectively using the inter prediction or the intra prediction for macroblocks of size 16×16 or more from the bitstream, and decodes image data encoded selectively using the inter prediction or the intra prediction for respective subblocks within the macroblock of size equal to or smaller than a prediction basic unit size identified by information on the extracted prediction basic unit (or a prediction basic unit identified by decoding information on the extracted prediction basic unit if necessary), to generate a reconstructed image.

According to various embodiments of the present disclosure as mentioned above, determining the block type to match the image characteristics enables combinations of diverse modes such as a large block and macroblock sizes, a minimum subblock size, available divisional block types, prediction mode types within a macroblock, and so on to achieve more effective encoding and decoding of high resolution images.

In the description above, although all of the components of the embodiments of the present disclosure have been explained as assembled or operatively connected as a unit, the present disclosure is not intended to limit itself to such embodiments. Rather, within the scope of the claimed invention, the respective components are selectively and operatively combined in any numbers. Every one of the components may be also implemented by itself in hardware while the respective ones can be combined in part or as a whole selectively and implemented in computer programs or program instructions having hardware program modules for executing functions of the hardware equivalents. Codes or code segments to constitute such a program may be easily deduced by a person of ordinary skill in the art. The computer programs are stored in non-transitory computer readable medium, which in operation realizes some embodiments of the present disclosure. Examples of the non-transitory computer readable medium, the candidates include magnetic media, such as a hard disk, a floppy disk, and a magnetic tape, optical media, such as a compact disk read only memory (CD-ROM) and a digital video disk (DVD), magneto-optical media, such as a floptical disk, and hardware devices that are specially configured to store and execute program instructions, such as a ROM, a random access memory (RAM), and a flash memory. The examples of the computer programs (or the program instructions) include not only machine language code generated by a compiler, but also high-level language code that can be executed by a computer using an interpreter, and so on. The above-described hardware devices are configured to operate as one or more software modules in order to perform the operation of the present disclosure, and vice versa.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person having ordinary skill in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those having ordinary skill in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, the scope of the claimed invention is not to be limited by the explicitly described above embodiments but by the claims and the equivalents thereof.

What is claimed is:

1. A method performed by an apparatus of decoding a video in the unit of blocks, the method comprising:
   decoding information on a block size from a bitstream;
   determining a maximum block size to be used for decoding an encoded image, based on the information on the block size; and
   reconstructing an image by decoding the encoded image using the determined maximum block size,
   wherein the information on the block size includes a first information on a minimum block size and a second information on a difference between the minimum block size and the maximum block size,
   wherein the second information has a value of $\log_2$ (MB size/X), where MB size is the maximum block size and X is the minimum block size.

2. The method of claim 1, wherein the first information and the second information are decoded by an exponential Golomb code.

3. The method of claim 1, wherein the maximum block size is determined among block sizes ranging from a size of 16*16 pixels to a size of 64*64 pixels.

4. The method of claim 1, wherein the reconstruction of the image comprises:
   dividing a current block to be decoded into one or more blocks, the current block having the determined maximum block size; and
   reconstructing the current block by inter-predicting or intra-predicting each of the blocks divided from the current block.

5. The method of claim 1, wherein the information on the block size is decoded from the bitstream in the unit of sequences.

6. An apparatus of decoding a video in the unit of blocks, the apparatus comprising:
   a size determiner configured to
      extract information on a block size from a bitstream, and
      determine a maximum block size to be used for decoding an encoded image, based on the information on the block size; and
   a video decoder configured to reconstruct an image by decoding the encoded image using the determined maximum block size,
   wherein the information on the block size includes a first information on a minimum block size and a second information on a difference between the minimum block size and the maximum block size,
   wherein the second information has a value of $\log_2$ (MB size/X), where MB size is the maximum block size and X is the minimum block size.

7. The apparatus of claim 6, wherein the first information and the second information are decoded by using an exponential Golomb code.

8. The apparatus of claim 6, wherein the maximum block size is determined among block sizes ranging from a size of 16*16 pixels to a size of 64*64 pixels.

9. The apparatus of claim 6, wherein the video decoder is configured to
   divide a current block to be decoded into one or more blocks, the current block having the maximum block size, and
   reconstruct the current block by inter-predicting or intra-predicting each of the blocks divided from current block.

10. The apparatus of claim 6, wherein the information on the block size is extracted from the bitstream in the unit of sequences.

* * * * *